United States Patent
Kim et al.

(10) Patent No.: US 12,425,160 B2
(45) Date of Patent: Sep. 23, 2025

(54) METHOD AND APPARATUS FOR TRANSMITTING OR RECEIVING CHANNEL STATE INFORMATION IN WIRELESS COMMUNICATION SYSTEM

(71) Applicant: LG ELECTRONICS INC., Seoul (KR)

(72) Inventors: Kyuseok Kim, Seoul (KR); Haewook Park, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 263 days.

(21) Appl. No.: 18/013,015

(22) PCT Filed: Jul. 22, 2021

(86) PCT No.: PCT/KR2021/009461
§ 371 (c)(1),
(2) Date: Dec. 27, 2022

(87) PCT Pub. No.: WO2022/025519
PCT Pub. Date: Feb. 3, 2022

(65) Prior Publication Data
US 2023/0246781 A1    Aug. 3, 2023

(30) Foreign Application Priority Data

Jul. 28, 2020    (KR) .................. 10-2020-0094072

(51) Int. Cl.
*H04L 5/00*    (2006.01)

(52) U.S. Cl.
CPC .................. *H04L 5/0051* (2013.01)

(58) Field of Classification Search
CPC ... H04L 5/0051; H04L 5/0057; H04L 5/0023; H04L 5/005; H04L 5/0094;
(Continued)

(56) References Cited

U.S. PATENT DOCUMENTS

2017/0373743 A1    12/2017  Park et al.
2018/0097534 A1    4/2018   Manolakos et al.
(Continued)

FOREIGN PATENT DOCUMENTS

KR    20170134526    12/2017

*Primary Examiner* — Rownak Islam
(74) *Attorney, Agent, or Firm* — Fish & Richardson P.C.

(57) ABSTRACT

Disclosed are a method and an apparatus for transmitting or receiving channel state information in a Wireless communication system. A method for transmitting channel state information (CSI) according to an embodiment of the present disclosure may comprise the steps of receiving configuration information related to the CSI; receiving a channel state information reference signal (CSI-RS) through a plurality of CSI-RS ports; and transmitting the CSI for each at least one CSI-RS port group on the basis of the configuration information, Wherein the plurality of CSI-RS ports are grouped into at least one CSI-RS port group, each of the at least one CSI-RS port group includes at least one CSI-RS port, and the CSI includes one or more of a port index, a delay value, and a coefficient for each of one or more specific CSI-RS ports for the each at least one CSI-RS port group.

15 Claims, 17 Drawing Sheets

(a) DEFINE A CSI-RS PORT GROUP ACCORDING TO A DIFFERENCE VALUE BETWEEN DL/UL CHANNELS (b) DL CHANNEL CORRESPONDING TO CSI-RS PORT GROUP 1

(c) DL CHANNEL CORRESPONDING TO CSI-RS PORT GROUP 2

(d) DL CHANNEL CORRESPONDING TO CSI-RS PORT GROUP 3

(58) Field of Classification Search
CPC .......... H04B 7/0408; H04B 7/06; H04B 7/08; H04B 17/318; H04B 7/0626; H04B 7/0456; H04W 72/04; H04W 8/24; H04W 72/0446
USPC ........................................................ 370/329
See application file for complete search history.

(56) References Cited

U.S. PATENT DOCUMENTS

| | | | |
|---|---|---|---|
| 2018/0102817 A1* | 4/2018 | Park | H04B 7/0417 |
| 2019/0089437 A1* | 3/2019 | Chen | H04B 7/0617 |
| 2020/0120528 A1 | 4/2020 | Gao et al. | |
| 2020/0204224 A1 | 6/2020 | Kang et al. | |
| 2021/0184742 A1* | 6/2021 | Gao | H04L 1/0031 |
| 2021/0242917 A1* | 8/2021 | Oh | H04B 7/0636 |
| 2021/0328644 A1* | 10/2021 | Hao | H04B 7/0639 |

* cited by examiner

FIG.7
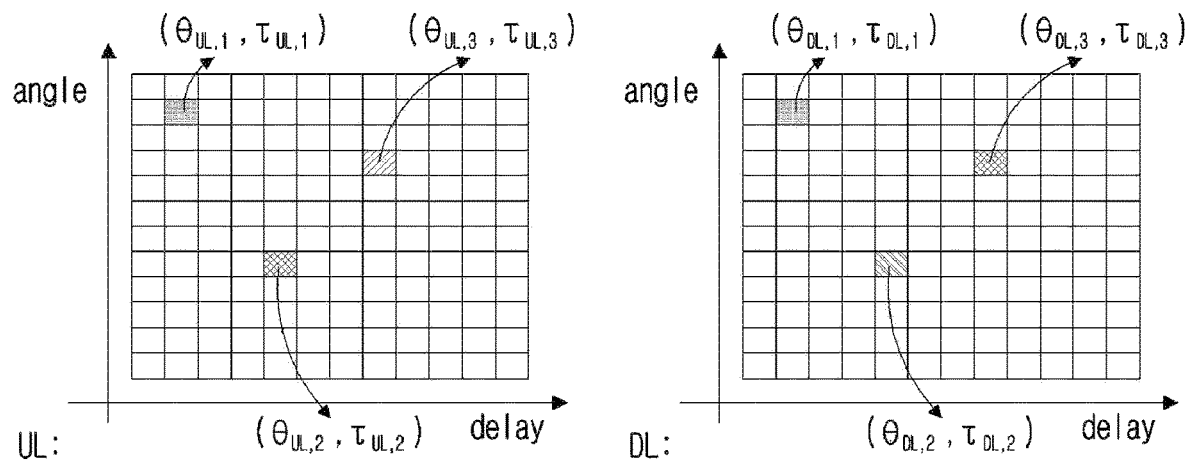
(a) high reciprocity
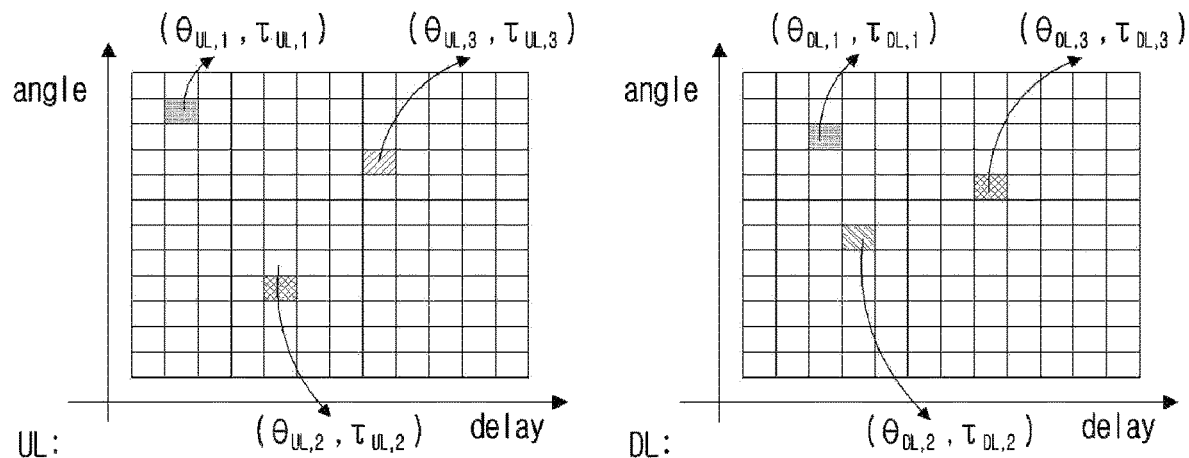
(b) low reciprocity

FIG.8
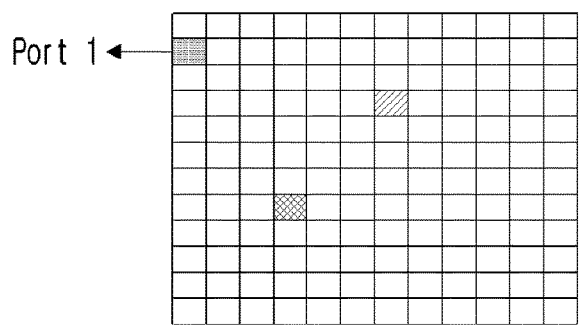
(a) DL CHANNEL CORRESPONDING
TO CSI-RS PORT 1
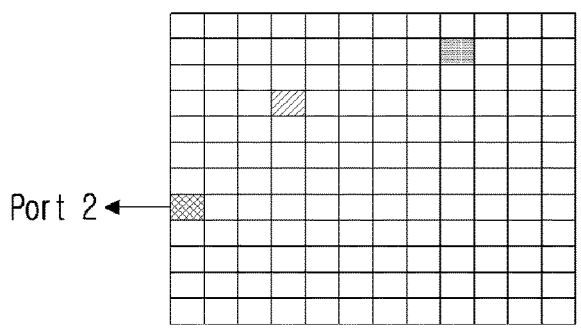
(b) DL CHANNEL CORRESPONDING
TO CSI-RS PORT 2
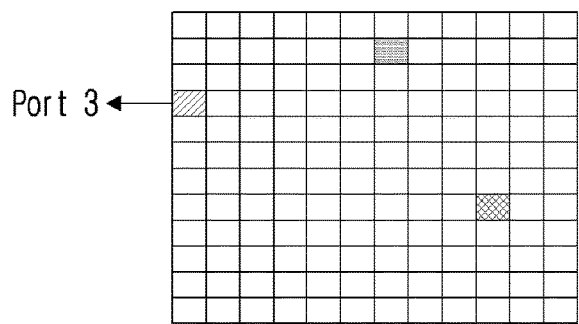
(c) DL CHANNEL CORRESPONDING
TO CSI-RS PORT 3

FIG.9
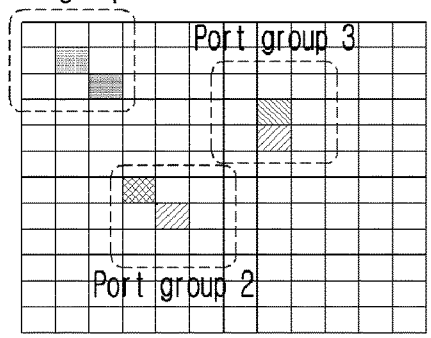
(a) DEFINE A CSI-RS PORT GROUP
ACCORDING TO A DIFFERENCE
VALUE BETWEEN DL/UL CHANNELS
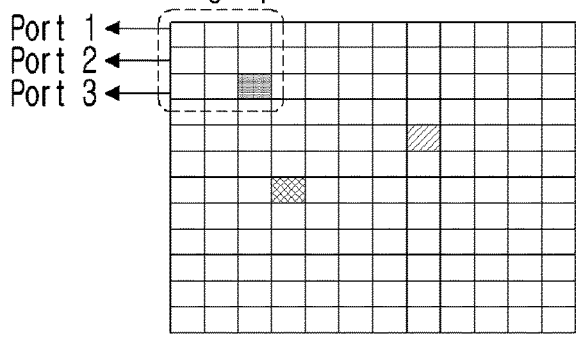
(b) DL CHANNEL CORRESPONDING
TO CSI-RS PORT GROUP 1
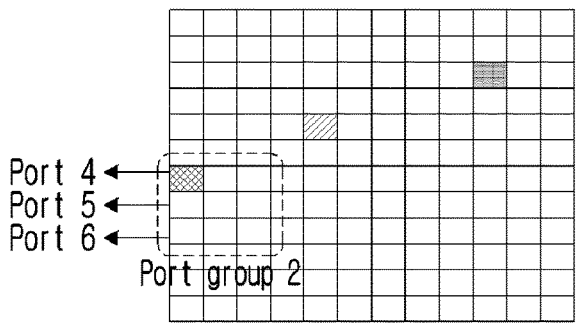
(c) DL CHANNEL CORRESPONDING
TO CSI-RS PORT GROUP 2
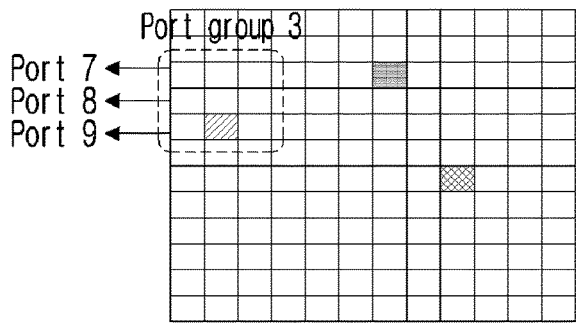
(d) DL CHANNEL CORRESPONDING
TO CSI-RS PORT GROUP 3

FIG.10
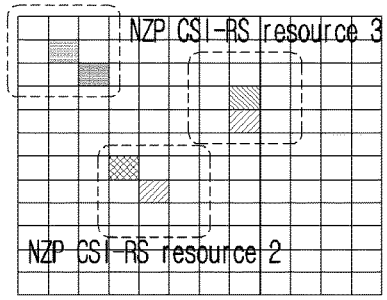
(a) DEFINE A CSI-RS PORT GROUP ACCORDING TO A DIFFERENCE VALUE BETWEEN DL / UL CHANNELS
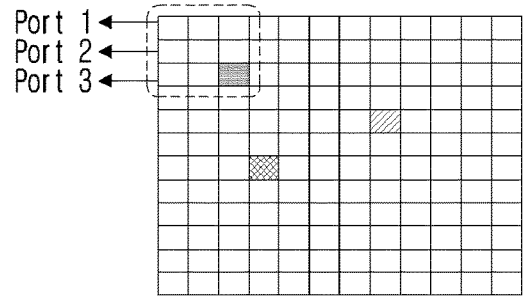
(b) CSI-RS PORT AND DL CHANNEL-1 CORRESPONDING TO NZP CSI-RS RESOURCE 1
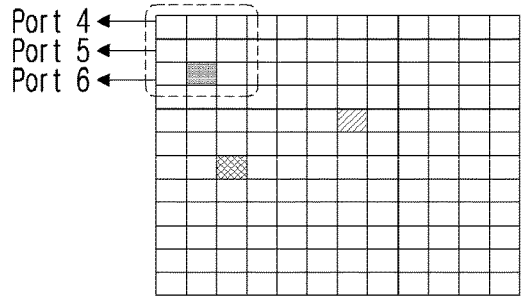
(c) CSI-RS PORT AND DL CHANNEL-2 CORRESPONDING TO NZP CSI-RS RESOURCE 1
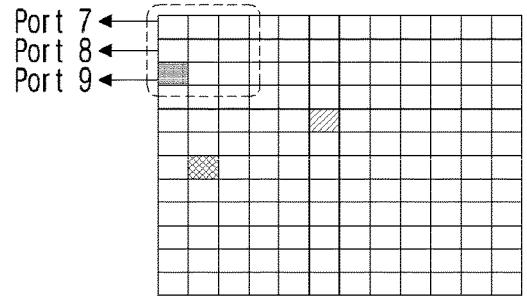
(d) CSI-RS PORT AND DL CHANNEL-3 CORRESPONDING TO NZP CSI-RS RESOURCE 1

FIG.11

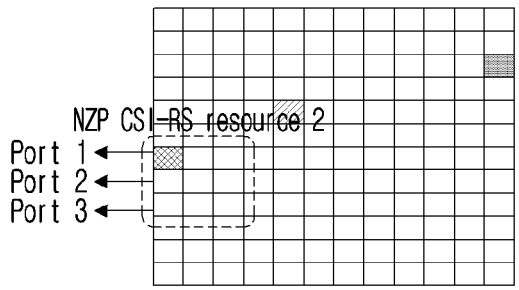

(a) CSI-RS PORT AND DL CHANNEL-1
CORRESPONDING TO NZP CSI-RS RESOURCE 2

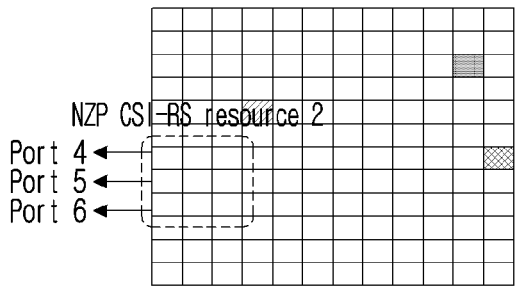

(b) CSI-RS PORT AND DL CHANNEL-2
CORRESPONDING TO NZP CSI-RS RESOURCE 2

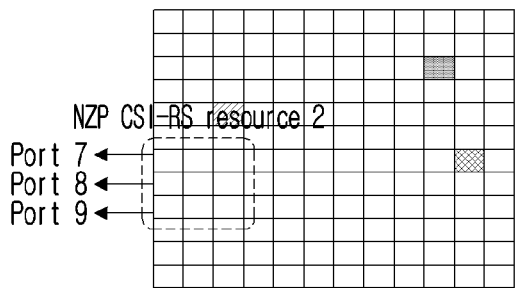

(c) CSI-RS PORT AND DL CHANNEL-3
CORRESPONDING TO NZP CSI-RS RESOURCE 2

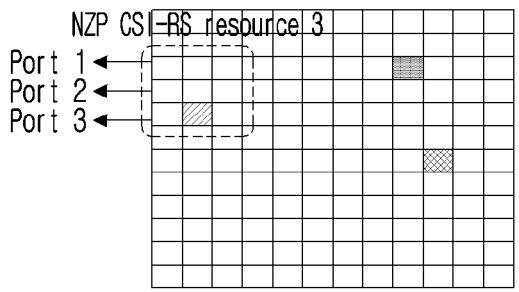

(d) CSI-RS PORT AND DL CHANNEL-1
CORRESPONDING TO NZP CSI-RS RESOURCE 3

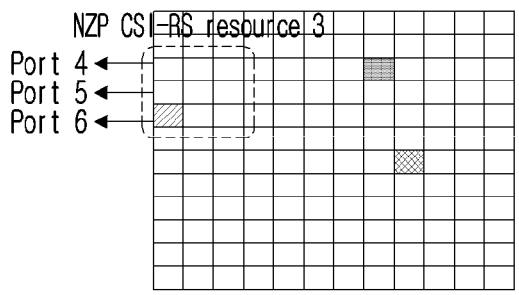

(e) CSI-RS PORT AND DL CHANNEL-2
CORRESPONDING TO NZP CSI-RS RESOURCE 3

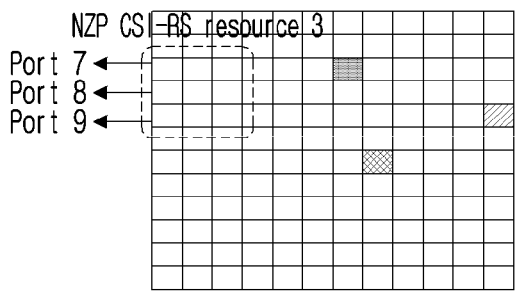

(f) CSI-RS PORT AND DL CHANNEL-3
CORRESPONDING TO NZP CSI-RS RESOURCE 3

METHOD AND APPARATUS FOR TRANSMITTING OR RECEIVING CHANNEL STATE INFORMATION IN WIRELESS COMMUNICATION SYSTEM

CROSS-REFERENCE TO RELATED APPLICATIONS

This application is a National Stage Application under 35 U.S.C. § 371 of International Application No. PCT/KR2021/009461, filed on Jul. 22, 2021, which claims the benefit of an earlier filing date and right of priority to Korean Application No. 10-2020-0094072, filed on Jul. 28, 2020, the contents of which are all hereby incorporated by reference herein in their entirety.

TECHNICAL FIELD

The present disclosure relates to a wireless communication system, and more particularly, to a method and apparatus for transmitting and receiving channel state information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and apparatus for transmitting and receiving channel state information.

In addition, an additional technical problem of the present disclosure is to provide a method and apparatus for transmitting and receiving channel state information in units of CSI-RS port groups.

The technical objects to be achieved by the present disclosure are not limited to the above-described technical objects, and other technical objects which are not described herein will be clearly understood by those skilled in the pertinent art from the following description.

A method for a user equipment (UE) to transmit channel state information in a wireless communication system according to an embodiment of the present disclosure may include: receiving, from a base station, configuration information related to the CSI; receiving, from the base station, a channel state information reference signal (CSI-RS) through a plurality of CSI-RS ports; and transmitting, to the base station, the CSI for each of at least one CSI-RS port group based on the configuration information, and the plurality of CSI-RS ports may be grouped into the at least one CSI-RS port group, and each of the at least one CSI-RS port group may include at least one CSI-RS port, and the CSI may include at least one of a port index, a delay value, or a coefficient for each of at least one of specific CSI-RS port for each of the at least one CSI-RS port group.

A method for a base station to receive channel state information in a wireless communication system according to an embodiment of the present disclosure may include: transmitting, to a user equipment (UE), configuration information related to the CSI; transmitting, to the base station, a channel state information reference signal (CSI-RS) through a plurality of CSI-RS ports; and receiving, from the UE, the CSI for each of at least one CSI-RS port group based on the configuration information, and the plurality of CSI-RS ports are grouped into the at least one CSI-RS port group, and each of the at least one CSI-RS port group may include at least one CSI-RS port, and the CSI may include at least one of a port index, a delay value, or a coefficient for each of at least one of specific CSI-RS port for each of the at least one CSI-RS port group.

According to an exemplary embodiment of the present disclosure, in a situation where downlink/uplink reciprocity is not strong, different configurations may be given for each CSI-RS port group, so flexibility may be improved.

In addition, according to an embodiment of the present disclosure, the most suitable reporting operation may be performed in units of configured CSI-RS ports, thereby reducing overhead for reporting.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 7 illustrates a case in which different reciprocity is applied to downlink and uplink channels in a wireless communication system to which the present disclosure may be applied.

FIG. 8 illustrates a method of pre-compensating a delay value of each port in a wireless communication system to which the present disclosure may be applied.

FIG. 9 illustrates a case of configuring a CSI-RS port group in a wireless communication system to which the present disclosure may be applied.

FIGS. 10 and 11 illustrate a case in which a CSI-RS port group corresponds to an NZP CSI-RS resource in a wireless communication system to which the present disclosure may be applied.

DETAILED DESCRIPTION

Figure 1:
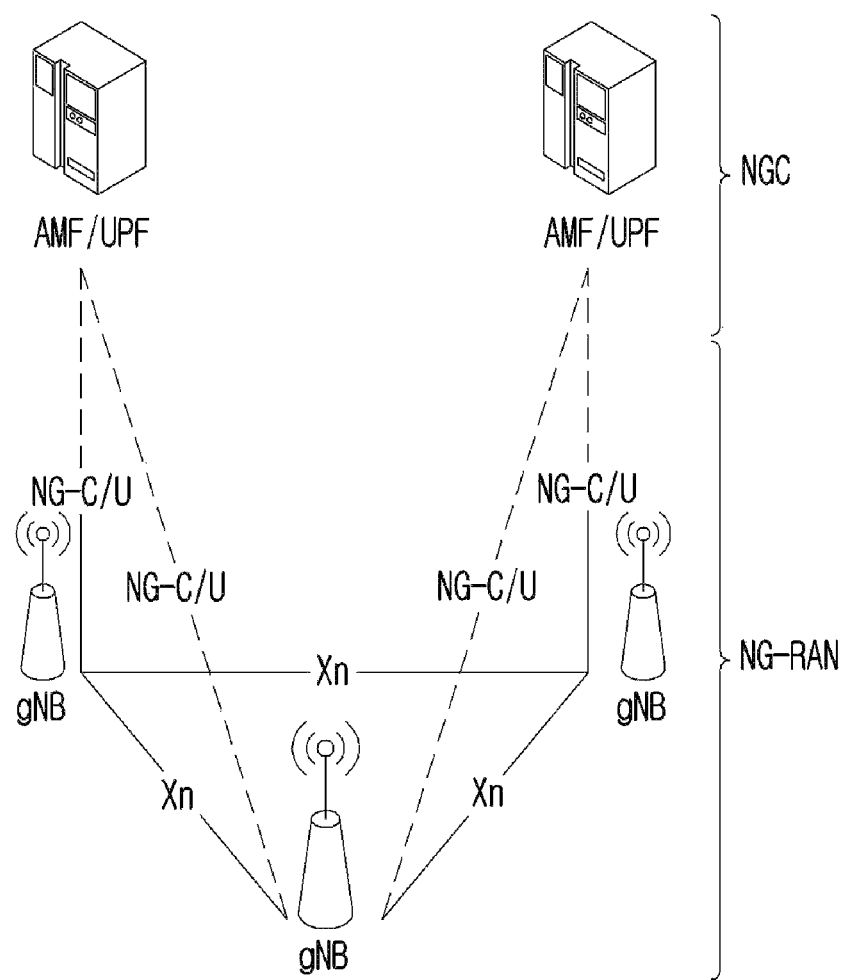
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
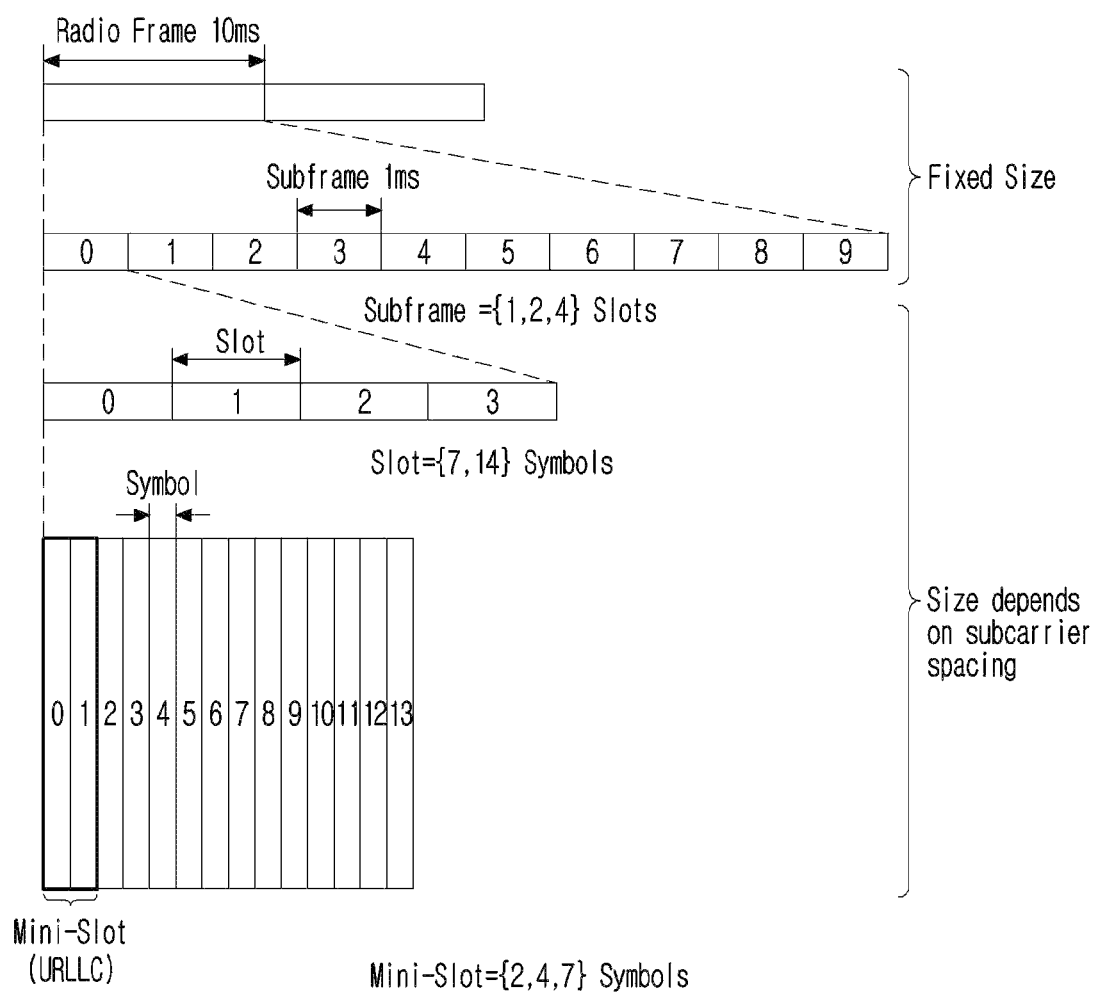
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz–7125 MHz | 15, 30, 60 kHz |
| FR2 | 24250 MHz–52600 MHz | 60, 120, 240 kHz |

Regarding a frame structure in an NR system, a size of a variety of fields in a time domain is expresses as a multiple of a time unit of $T_c=1/(Δf_{max} \cdot N_f)$. Here, $Δf_{max}$ is $480 \cdot 10^3$ Hz and $N_f$ is 4096. Downlink and uplink transmission is configured (organized) with a radio frame having a duration of $T_f=1/(Δf_{max}N_f/100) \cdot T_c=10$ ms. Here, a radio frame is configured with 10 subframes having a duration of $T_{sf}=(Δf_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^μ \in \{0, \ldots, N_{slot}^{subframe,μ}-1\}$ in a subframe and are numbered in an increasing order of $n_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame,μ}$ | $N_{slot}^{subframe,μ}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
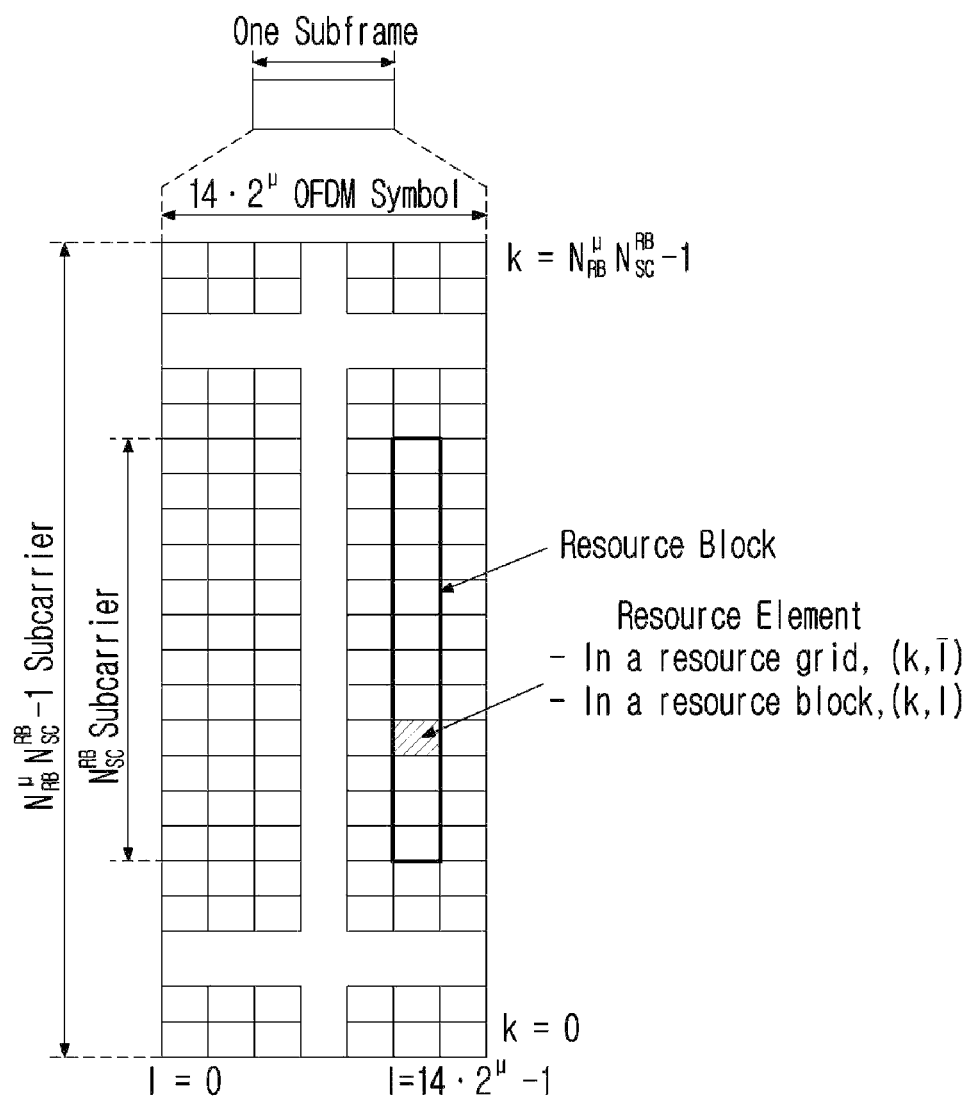
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with $14 \cdot 2^μ$ OFDM symbols, but it is not limited thereto. In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ \leq N_{RB}^{max,μ}$. The $N_{RB}^{max,μ}$ represents a maximum transmission bandwidth, which may be different between an uplink and a downlink as well as between numerologies. In this case, one resource grid may be configured per p and antenna port p. Each element of a resource grid for μ and an antenna port p is referred to as a resource element and is uniquely identified by an index pair (k,l'). Here, k=0, ..., $N_{RB}^μ N_{sc}^{RB}-1$ is an index in a frequency domain and l'=0, ..., $2^μ N_{symb}^{(μ)}-1$ refers to a position of a symbol in a subframe. When referring to a resource element in a slot, an index pair (k,l) is used. Here, l=0, ..., $N_{symb}^μ-1$. A resource element (k,l') for μ and an antenna port p corresponds to a complex value, $a_{k,l'}^{(p,μ)}$. When there is no risk of confusion or when a specific antenna port or numerology is not specified, indexes p and p may be dropped, whereupon a complex value may be $a_{k,l'}^{(p)}$ or $a^{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad [\text{Equaiton 1}]$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad [\text{Equation 2}]$$

$N_{BWP,i}^{start,\mu}$ is a common resource block that a BWP starts relatively to common resource block 0.

Figure 4:
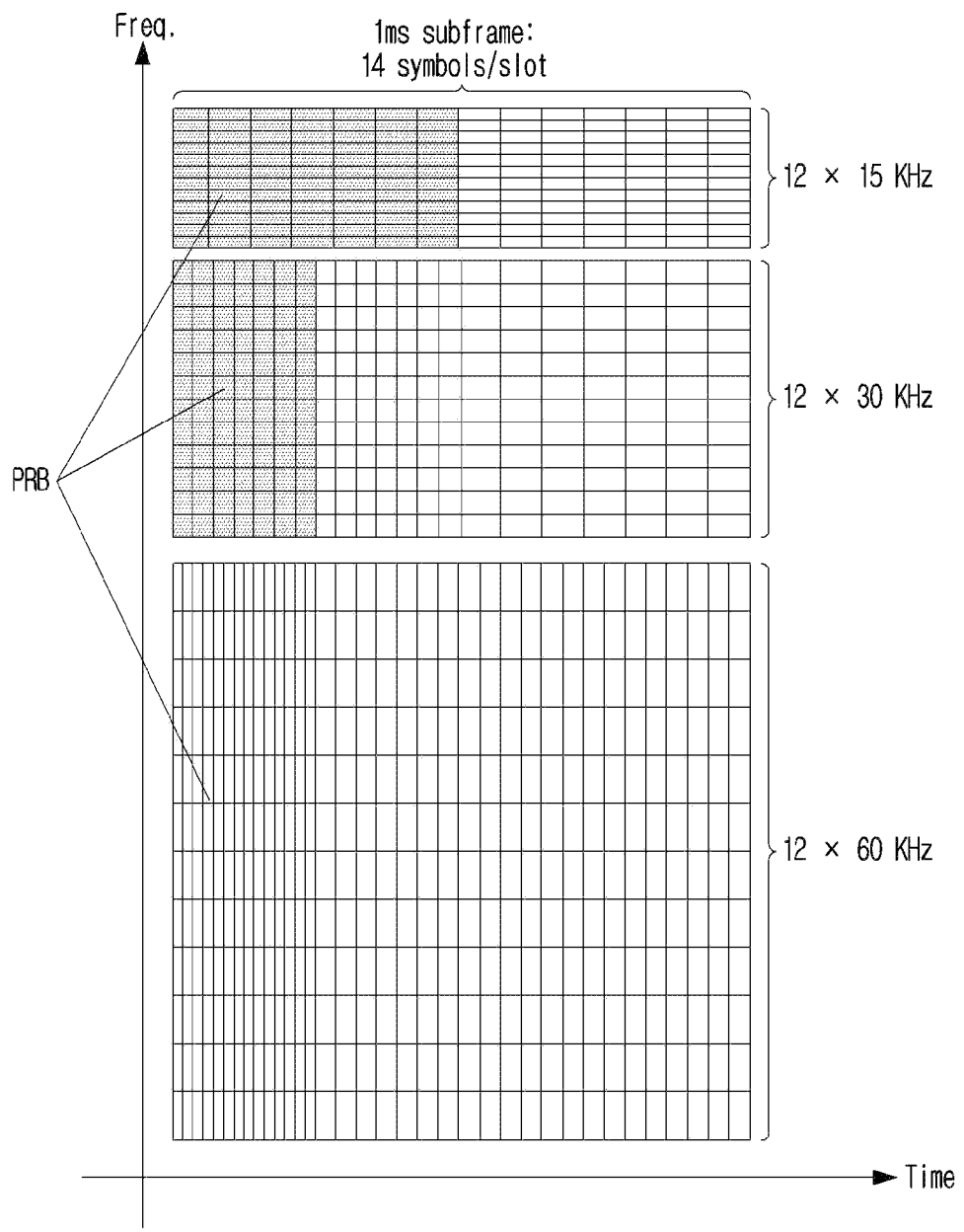
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
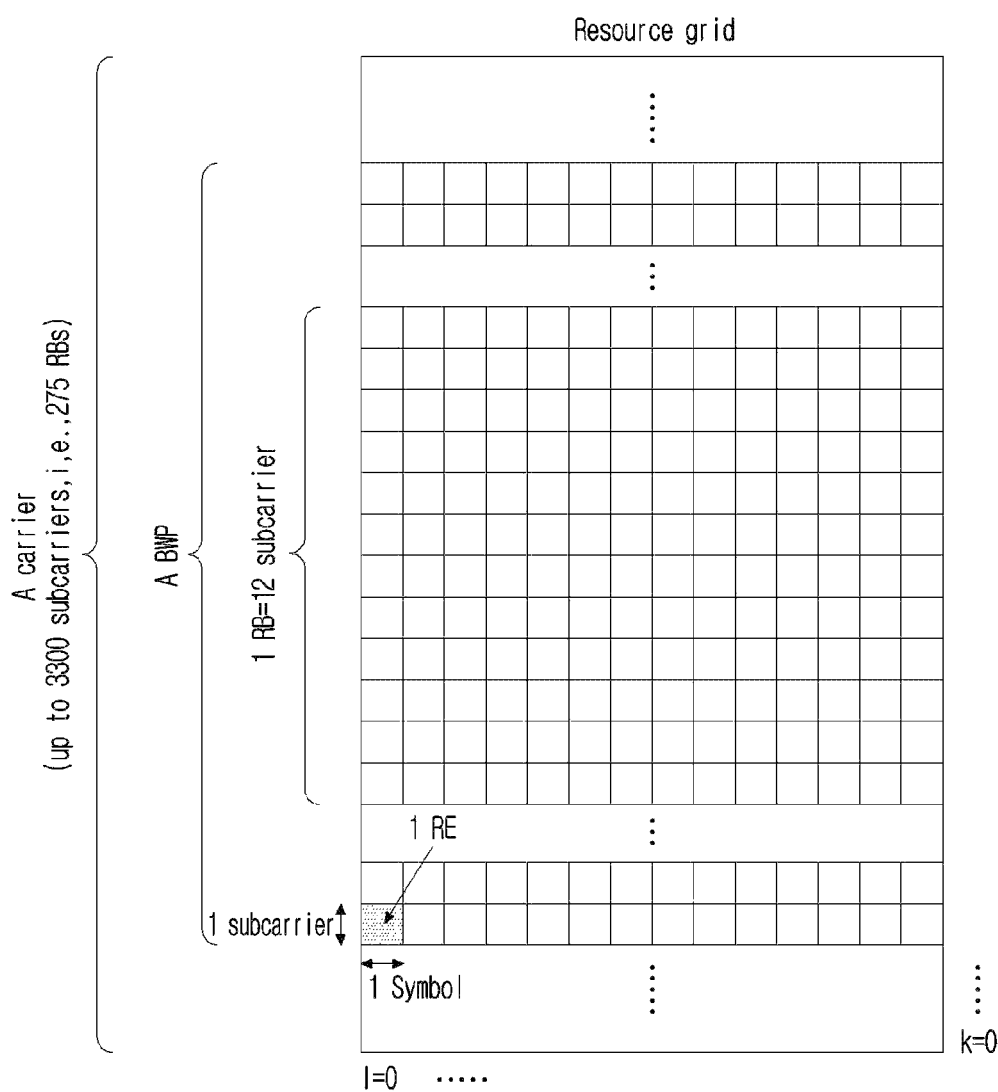
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
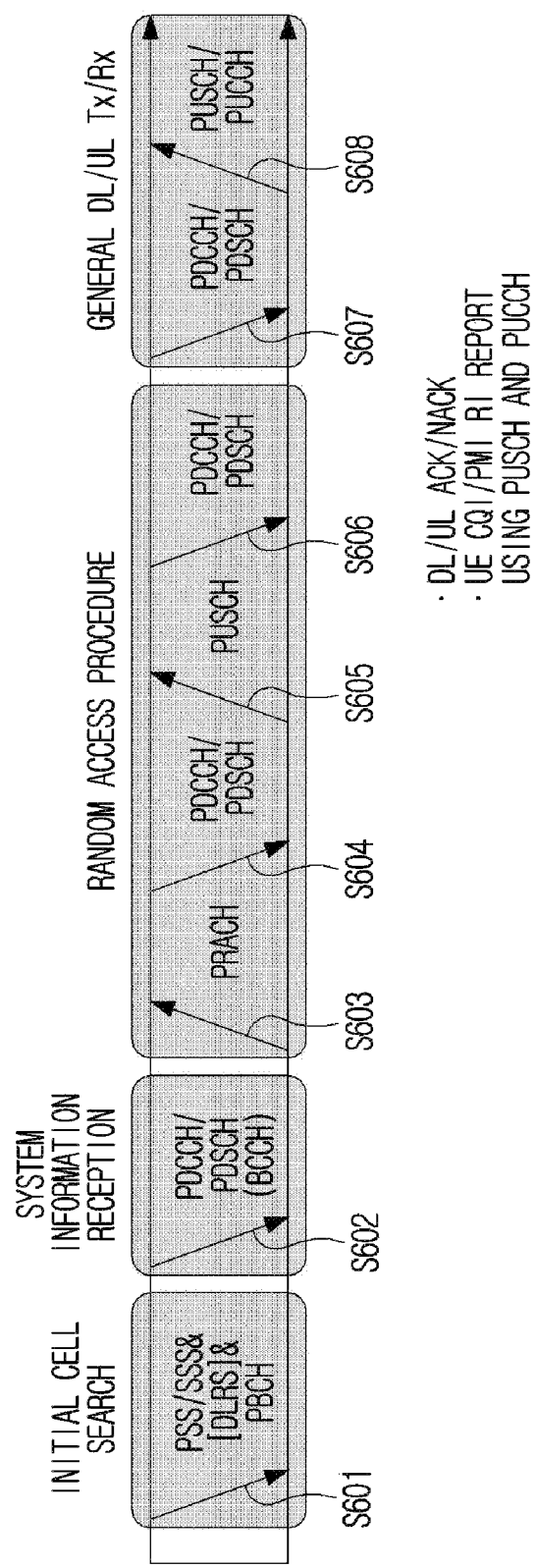
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI Related Operation

In the New Radio (NR) system, CSI-RS (channel state information-reference signal) is used for time/frequency tracking, CSI computation, L1(layer 1)-RSRP (reference signal received power) computation and mobility. Here, the CSI calculation is related to CSI acquisition, and the L1-RSRP calculation is related to beam management (BM).

CSI (channel state information) collectively refers to information that can indicate the quality of a radio channel (or referred to as a link) formed between a terminal and an antenna port.

In order to perform one of the uses of the CSI-RS as described above, a terminal (e.g., user equipment, UE) receives configuration information related to CSI from a base station (e.g., general Node B (gNB)) through radio resource control (RRC) signaling.

The CSI-related configuration information may include at least one of CSI-IM (interference management) resource-related information, CSI measurement configuration-related information, CSI resource configuration-related information, CSI-RS resource-related information, or CSI reporting configuration-related information.

i) CSI-IM resource related information may include CSI-IM resource information, CSI-IM resource set information, and the like. A CSI-IM resource set is identified by a CSI-IM resource set identifier (ID), and one resource set includes at least one CSI-IM resource. Each CSI-IM resource is identified by a CSI-IM resource ID.

ii) CSI resource configuration related information may be expressed as CSI-ResourceConfig IE. CSI resource configuration related information defines a group including at least one of a non-zero power (NZP) CSI-RS resource set, a CSI-IM resource set, and a CSI-SSB resource set. That is, the CSI resource configuration related information includes a CSI-RS resource set list, and the CSI-RS resource set list may include at least one of a NZP CSI-RS resource set list, a CSI-IM resource set list, and a CSI-SSB resource set list. A CSI-RS resource set is identified by a CSI-RS resource set ID, and one resource set includes at least one CSI-RS resource. Each CSI-RS resource is identified by a CSI-RS resource ID.

For each NZP CSI-RS resource set, parameters indicating the use of CSI-RS (e.g., BM-related 'repetition' parameter, tracking-related 'trs-Info' parameter) may be configured.

iii) CSI report configuration-related information includes a report configuration type (reportConfigType) parameter representing time domain behavior and a reportQuantity parameter representing a CSI-related quantity (quantity) for reporting. The time domain behavior may be periodic, aperiodic or semi-persistent.

The terminal measures CSI based on configuration information related to the CSI.

The CSI measurement may include (1) a process of receiving a CSI-RS by a terminal and (2) a process of computing CSI through the received CSI-RS, which will be described in detail later.

In the CSI-RS, resource element (RE) mapping of CSI-RS resources is configured in time and frequency domains by higher layer parameter CSI-RS-ResourceMapping.

The terminal reports the measured CSI to the base station.

Here, when the quantity of CSI-ReportConfig is configured to 'none (or No report)', the terminal may omit the report. However, even when the quantity is configured to 'none (or No report)', the terminal may report to the base station. When the quantity is configured to 'none', it is a case of triggering an aperiodic TRS or a case of configuring repetition. Here, the report of the terminal may be omitted only when repetition is configured to 'ON'.

CSI Measurement

The NR system supports more flexible and dynamic CSI measurement and reporting. Here, the CSI measurement may include a procedure of receiving a CSI-RS and acquiring CSI by calculating the received CSI-RS.

As a time domain behavior of CSI measurement and reporting, aperiodic/semi-persistent/periodic channel measurement (CM) and interference measurement (IM) are supported. For configuration of CSI-IM, a 4-port NZP CSI-RS RE pattern is used.

The CSI-IM based IMR of NR has a design similar to that of CSI-IM of LTE, and is configured independently of ZP CSI-RS resources for PDSCH rate matching. And, in NZP CSI-RS based IMR, each port emulates an interference layer with (preferred channel and) precoded NZP CSI-RS. This is for intra-cell interference measurement for multi-user cases, and mainly targets MU interference.

The base station transmits the precoded NZP CSI-RS to the terminal on each port of the configured NZP CSI-RS based IMR.

The UE assumes a channel/interference layer for each port in the resource set and measures interference.

For a channel, if there is no PMI and RI feedback, multiple resources are configured in a set, and the base station or network indicates a subset of NZP CSI-RS resources for channel/interference measurement through DCI.

The resource setting and resource setting configuration will be described in more detail.

Resource Setting

Each CSI resource setting 'CSI-ResourceConfig' includes configuration for S≥1 CSI resource set (given by higher layer parameter csi-RS-ResourceSetList). CSI resource setting corresponds to CSI-RS-resourcesetlist. Here, S represents the number of configured CSI-RS resource sets. Here, the configuration for the S≥1 CSI resource set includes each CSI resource set including CSI-RS resources (consisting of NZP CSI-RS or CSI-IM) and SS/PBCH block (SSB) resources used for L1-RSRP computation.

Each CSI resource setting is located in a DL BWP (bandwidth part) identified by higher layer parameter bwp-id. And, all CSI resource settings linked to the CSI reporting setting have the same DL BWP.

The time domain behavior of the CSI-RS resource within the CSI resource setting included in the CSI-ResourceConfig IE is indicated by the higher layer parameter resourceType and may be configured to aperiodic, periodic or semi-persistent. For periodic and semi-persistent CSI resource setting, the number of configured CSI-RS resource sets (S) is limited to '1'. For periodic and semi-persistent CSI resource settings, the configured periodicity and slot offset are given in the numerology of the associated DL BWP, as given by bwp-id.

When a terminal is configured with multiple CSI-ResourceConfigs including the same NZP CSI-RS resource ID, the same time domain behavior is configured for the CSI-ResourceConfig.

When a terminal is configured with multiple CSI-ResourceConfigs including the same CSI-IM resource ID, the same time domain behavior is configured for the CSI-ResourceConfig.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS for CSI acquisition, and interference measurement resource (IMR) may be CSI-IM and NZP CSI-RS for IM.

Here, CSI-IM (or ZP CSI-RS for IM) is mainly used for inter-cell interference measurement.

And, NZP CSI-RS for IM is mainly used for intra-cell interference measurement from multi-user.

The UE may assume that CSI-RS resource(s) for channel measurement and CSI-IM/NZP CSI-RS resource(s) for interference measurement configured for one CSI reporting are 'QCL-TypeD' for each resource.

Resource Setting Configuration

As described above, resource setting may mean a resource set list.

For aperiodic CSI, each trigger state configured using the higher layer parameter CSI-AperiodicTriggerState is associated with one or more CSI-ReportConfigs in which each CSI-ReportConfig is linked to a periodic, semi-persistent or aperiodic resource setting.

One reporting setting may be linked to up to three resource settings.

When one resource setting is configured, the resource setting (given by the higher layer parameter resourcesForChannelMeasurement) is for channel measurement for L1-RSRP computation.

When two resource settings are configured, the first resource setting (given by higher layer parameter resourcesForChannelMeasurement) is for channel measurement, and the second resource setting (given by csi-IM-ResourcesForInterference or nzp-CSI-RS-ResourcesForInterference) is for interference measurement performed on CSI-IM or NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

If one resource setting (given by resourcesForChannelMeasurement) is configured, the resource setting is for channel measurement for L1-RSRP computation.

When two resource settings are configured, the first resource setting (given by resourcesForChannelMeasurement) is for channel measurement, and the second resource setting (given by the higher layer parameter csi-IM-ResourcesForInterference) is used for interference measurement performed on CSI-IM.

CSI Computation

If interference measurement is performed on CSI-IM, each CSI-RS resource for channel measurement is associated with the CSI-IM resource by resource in the order of CSI-RS resources and CSI-IM resources in a corresponding resource set. The number of CSI-RS resources for channel measurement is equal to the number of CSI-IM resources.

And, when interference measurement is performed in NZP CSI-RS, the UE does not expect to be configured to one or more NZP CSI-RS resources in a related resource set within resource setting for channel measurement.

A terminal for which the higher layer parameter nzp-CSI-RS-ResourcesForInterference is configured does not expect 18 or more NZP CSI-RS ports to be set in the NZP CSI-RS resource set.

For CSI measurement, the UE assumes the following.

Each NZP CSI-RS port configured for interference measurement corresponds to an interference transport layer.

All interference transport layers of the NZP CSI-RS port for interference measurement consider energy per resource element (EPRE) rates.

Another interference signal on the RE(s) of the NZP CSI-RS resource for channel measurement, an NZP CSI-RS resource for interference measurement, or a CSI-IM resource for interference measurement.

CSI Report

For CSI reporting, the time and frequency resources available to the terminal are controlled by the base station.

CSI (channel state information) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), or L1-RSRP.

For CQI, PMI, CRI, SSBRI, LI, RI, L1-RSRP, the terminal is configured by higher layers with N≥1 CSI-ReportConfig reporting setting, M≥1 CSI-ResourceConfig resource setting, and a list of one or two trigger states (provided by aperiodicTriggerStateList and semiPersistentOnPUSCH-TriggerStateList). Each trigger state in the aperiodicTriggerStateList includes an associated CSI-ReportConfigs list indicating channel and optionally resource set IDs for interference. In semiPersistentOnPUSCH-TriggerStateList, each trigger state contains one associated CSI-ReportConfig.

And, the time domain behavior of CSI reporting supports periodic, semi-persistent, and aperiodic.

i) Periodic CSI reporting is performed on short PUCCH and long PUCCH. Periodicity and slot offset of Periodic CSI reporting may be configured to RRC, refer to CSI-ReportConfig IE.

ii) SP (semi-periodic) CSI reporting is performed on short PUCCH, long PUCCH, or PUSCH.

In case of SP CSI on Short/long PUCCH, periodicity and slot offset are configured to RRC, and CSI reporting is activated/deactivated by separate MAC CE/DCI.

In the case of SP CSI on PUSCH, the periodicity of SP CSI reporting is set to RRC, but the slot offset is not configured to RRC, and SP CSI reporting is activated/deactivated by DCI (format 0_1). For SP CSI reporting on PUSCH, a separate RNTI (SP-CSI C-RNTI) is used.

The initial CSI reporting timing follows the PUSCH time domain allocation value indicated in DCI, and the subsequent CSI reporting timing follows the period set by RRC.

DCI format 0_1 includes a CSI request field and can activate/deactivate a specific set SP-CSI trigger state. SP CSI reporting has the same or similar activation/deactivation as the mechanism with data transmission on SPS PUSCH.

iii) Aperiodic CSI reporting is performed on PUSCH and is triggered by DCI. In this case, information related to the trigger of aperiodic CSI reporting may be delivered/instructed/configured through MAC-CE.

In the case of AP CSI having AP CSI-RS, AP CSI-RS timing is configured by RRC, and timing for AP CSI reporting is dynamically controlled by DCI.

For NR, the method of dividing and reporting CSI in multiple reporting instances applied to PUCCH-based CSI reporting in LTE (e.g., transmission in the order of RI, WB PMI/CQI, and SB PMI/CQI) is not applied. Instead, NR restricts configuration of a specific CSI report in short/long PUCCH, and a CSI omission rule is defined. And, in relation to AP CSI reporting timing, PUSCH symbol/slot location is dynamically indicated by DCI. And, candidate slot offsets are configured by RRC. For CSI reporting, a slot offset (Y) is configured for each reporting setting. For UL-SCH, slot offset K2 is configured separately.

Two CSI latency classes (low latency class, high latency class) are defined in terms of CSI computation complexity. In the case of low latency CSI, it is WB CSI including up to 4 ports Type-I codebook or up to 4-ports non-PMI feedback CSI. High latency CSI refers to CSI other than low latency CSI. For a normal UE, (Z, Z') is defined in units of OFDM symbols. Here, Z represents the minimum CSI processing time from receiving aperiodic CSI triggering (DCI) to performing CSI reporting.

In addition, Z' represents the minimum CSI processing time from receiving the CSI-RS for channel/interference to performing CSI reporting.

Additionally, the terminal reports the number of CSIs that may be simultaneously calculated.

Hereinafter, the method proposed in the present disclosure will be described in detail.

When the base station transmits data to the terminal, in order to adaptively configure the optimal number of ranks (number of transport layers)/precoding matrix/MCS (modulation and coding scheme) according to the channel between the base station and the terminal, a process of exchanging channel state information (CSI) between the base station and the terminal is required. To this end, the base station may transmit a reference signal (RS) for CSI acquisition to the terminal. And, the terminal may receive the RS, estimate CSI based on it, and report the CSI to the base station. The base station may configure the number of ranks/precoding matrix/MCS suitable for scheduling data to the terminal based on the CSI reported from the terminal.

If the base station may utilize the reciprocity of the DL/UL channel in the process of acquiring the CSI of the terminal, the overhead of RS to be transmitted by the base station to the terminal and the overhead for the terminal to report CSI to the base station may be reduced, and system performance may be improved based on more accurate CSI. Assuming DL/UL duplexing of a frequency domain duplexing (FDD) method, like a channel model based on parameters (e.g., Delay spreads such as DS (delay spread), ASD (azimuth angle spread of departure), ASA (azimuth angle spread of arrival), ZSD (zenith angle spread of departure), ZSA (zenith angle spread of arrival) and parameters related to angular spread, etc.) that reflect the correlation between a defined reference (or anchor) frequency and other frequencies from 0.5 GHz to 100 GHz, angle and delay reciprocity may be assumed for DL/UL channels.

In addition, overhead generated in the CSI acquisition process may be reduced by utilizing this reciprocity, and system performance may be improved by acquiring more accurate CSI.

In the present disclosure, a method for transmitting and receiving CSI using angle and delay reciprocity for DL/UL channels is proposed.

Prior to describing the details of the technology proposed in this disclosure, a Type II codebook introduced in release (Rel) 15/16 of 3GPP TS 38 will be briefly described.

Rel-15 Type II Codebook

In the case of a type II codebook, L basis DFT (discrete fourier transform) vectors are used per specific polarization (pole) among oversampled DFT vectors. Then, a precoding matrix is constructed by applying a wide band (WB) amplitude coefficient and a sub-band (SB) amplitude/phase coefficient to the corresponding basis DFT vectors. Among the oversampled DFT vectors, a specific vector is equal to $V_{i,m}$ and is defined as Equation 3 below in the standard.

$$u_m = \begin{cases} \begin{bmatrix} 1 & e^{j\frac{2\pi m}{O_2 N_2}} & \cdots & e^{j\frac{2\pi m(N_1-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_2 N_2}} u_m & \cdots & e^{j\frac{2\pi l(N_1-1)}{O_2 N_2}} u_m \end{bmatrix}^T$$

[Equation 3]

Here, $N_1$ and $N_2$ represent the number of antenna ports in the first dimension and the second dimension, respectively, and are configured by an upper layer parameter n1-n2-codebookSubsetRestriction. The number of CSI-RS ports ($P_{CSI-RS}$) is $2N_1 N_2$. $O_1$ and $O_2$ represent oversampling factors in the first dimension and the second dimension, respectively. The configuration of ($N_1$, $N_2$) and ($O_1$, $O_2$) supported for a given number of CSI-RS ports are defined in the standard.

L represents the number of beams, and the value of L is configured by a higher layer parameter numberOfBeams. Here, L=2 when $P_{CSI-RS}=4$, and L∈{2,3,4} when $P_{CSI-RS}>4$.

Codebooks for layer 1 and layer 2 are defined in the standard. Here, indices $m_1^{(i)}$ and $m_2^{(i)}$ as in Equation 4 below are applied to 1 and m in Equation 3, respectively, and a precoding matrix is constructed based on these DFT basis vectors.

$$m_1^{(i)}=O_1 n_1^{(i)}+q_1, m_2^{(i)}=O_2 n_2^{(i)}+q_2$$ [Equation 4]

Here, i is 0, 1, . . . , L−1. $n_1^{(i)}$∈{0, 1, . . . , $N_1$−1}, and $n_2^{(i)}$∈{0, 1, . . . , $N_2$−1}. $q_1$∈{0, 1, . . . , $O_1$−1}, and $q_2$∈{0, 1, . . . , $O_2$−1}. The values of $n_1^{(i)}$ and $n_2^{(i)}$ are determined according to the algorithm defined in the standard.

Rel-15 Type II Port Selection Codebook

In the case of the Type II port selection codebook, in the above Rel-15 Type II codebook, a method of constructing a precoding matrix by replacing L base DFT vectors per specific pole with beamformed CSI-RS ports is used.

Rel-16 Type II Codebook

In the case of the Rel-16 Type II codebook, a method of compressing and reporting codebook information using frequency domain correlation with respect to the aforementioned Rel-15 Type II codebook is used. In this case, compressed information may be configured based on a set of some vectors of an oversampled DFT codebook in order to compress codebook information. Here, a set of partial vectors of the oversampled DFT codebook may be referred to as 'frequency domain (FD) basis vectors'.

$M_v$ FD basis vectors are defined in the standard as shown in Equation 5 below.

$$[y_{0,l}^{(f)}, y_{1,l}^{(f)}, \ldots, y_{N_3-1,l}^{(f)}]^T$$ [Equation 5]

Here, f=0, 1, . . . , $M_v$−1. $N_3$ is the total number of precoding matrices. l=1, . . . , and v is a rank indicator (RI) value.

As above, among the $M_v$ FD basis vectors, the t-th element of the f-th vector (where t=0, . . . , $N_3$−1) is equal to $y_{t,l}^{(f)}$, and it is defined in the standard as shown in Equation 6 below.

$$y_{t,l}^{(f)} = e^{j\frac{2\pi t n_{3,l}^{(f)}}{N_3}}$$ [Equation 6]

Here, $n_{3,l}$ is defined in the standard as shown in Equation 7 below.

$$n_{(3,l)}=[n_{3,l}^{(0)}, \ldots, n_{3,l}^{(M_v-1)}], n_{(3,l)}^{(f)}\in\{0,1,\ldots,N_3-1\}$$ [Equation 7]

Here, f=0, 1, . . . , $M_v$−1. In the above equation, $M_v$ FD basis vector combinations selected by the terminal from the oversampled DFT codebook of size $N_3$ (i.e., among the total number of precoding matrices) through the value of $n_{3,1}^{(f)}$ may be reported to the base station.

Embodiment 1

Embodiment 1 is an embodiment related to a method for configuring/indicating a base station for CSI feedback of a terminal and a CSI reporting method for a terminal when downlink (DL)/uplink (UL) reciprocity is not perfect.

If a situation in which DL/UL reciprocity is perfect may be assumed, it may be assumed that the DL channel and the UL channel are the same. For example, an ideal environment in which there is no hardware failure such as TX/RX (or, DL/UL) calibration error on the base station and the terminal in a TDD (time domain duplexing) and the UL channel may be estimated with high accuracy based on the UL sounding signal (e.g., SRS), etc. may be seen as one of the environments in which perfect DL/UL reciprocity may be assumed. In an environment where such perfect DL/UL reciprocity may be assumed, it may be assumed that the UL channel and the DL channel estimated by the base station are the same.

For a frequency domain duplexing (FDD) environment, even if there is no hardware failure such as a TX/RX (or DL/UL) calibration error in the base station and the terminal and there is no error in UL channel estimation based on the UL sounding signal, a difference may occur between a DL channel and a UL channel estimated by the base station due to frequency dependent factors. Even in this case, frequency independent elements may be expected to have the same value on the DL channel and the UL channel estimated by the base station.

For example, the reciprocity model of DL/UL channels may be defined as a model that follows the assumption in which the DL and UL duplex distances are greater than the channel coherence bandwidth, certain parameters (e.g., parameters related to zenith angle of arrival (ZOA), zenith angle of departure (ZOD), azimuth angle of arrival (AOA), azimuth angle of departure (AOD), delay, relative power, and cross-polarization power ratio, etc.) are modeled identically in DL and UL channels (i.e., frequency independently), and the UL carrier frequency wavelength is changed for DL and the like.

In the case of following the reciprocity model of the DL/UL channels, the same angle/delay property may be assumed for the DL/UL channels. In this case, after estimating the UL channel using a UL sounding signal (e.g., SRS), the base station may utilize angle/delay characteristics expected to be the same in the DL channel. Through this, it may achieve an effect of improving the accuracy of an estimated value upon DL channel estimation and reducing the CSI feedback overhead of the terminal.

In an FDD environment, in at least one case among a case where an ideal reciprocity environment cannot be assumed (e.g., DL/UL reciprocity error), a case of hardware failure such as TX/RX (or DL/UL) calibration error in base station or terminal, or and case in which non-negligible errors may occur in the UL channel measured using the UL sounding signal, etc. even for elements (e.g., angle/lag characteristics) defined to have frequency independent characteristics according to the reciprocity model of the DL/UL channel as in the above-described example, it may not be assumed that the DL channel and the UL channel estimated by the base station are perfectly identical.

In the description set forth below, although factors that prevent the assumption that the above-described DL channel and the UL channel estimated by the base station are perfectly identical are referred to as DL/UL reciprocity errors for convenience, the use of these terms does not limit the technical scope of the present disclosure, and may include various examples that may cause the above error.

In this embodiment, as described above, due to factors that may affect DL/UL reciprocity, if an error occurs in the DL channel versus the UL channel for an element expected to be frequency independent between the UL channel and the DL channel estimated by the base station, disclosed are a method for configuring/indicating a base station and a CSI reporting method for a terminal for performing CSI feedback of a DL channel using a UL channel estimated based on a UL sounding signal or the like.

For example, the base station may configure one or more groups for CSI computation and reporting to the terminal. Here, one or more groups may correspond to units of CSI calculation and reporting of the terminal. For example, one or more groups are one or more CSI-RS port groups, and the terminal may calculate CSI for each CSI-RS port group and report it to the base station.

In addition, the terminal may include predetermined information for correcting/improving channel reciprocity between the DL channel and the UL channel in the CSI reported based on one or more groups. For example, the predetermined information may include one or more of port, angle, delay, or amplitude/phase related coefficients.

As a specific example, the base station may configure/indicate the terminal of at least one of one or more CSI-RS ports or one or more CSI-RS port groups. Each CSI-RS port group may include one or more CSI-RS ports. The UE may report a specific CSI-RS port (i.e., a port index of a specific CSI-RS port)/delay/coefficient value(s) to the base station for each CSI-RS port group. For example, the coefficient value may include at least one of an amplitude or a phase.

Additionally or alternatively, the base station may configure/indicate the terminal the number of CSI-RS port/delay/coefficient combinations to be reported for each CSI-RS port group. For example, if the number of combinations is 1, one CSI-RS port/delay/coefficient value (e.g., CSI-RS port 1/delay 1/coefficient 1) per CSI-RS port group may be reported to the base station. If the number of combinations is 2, two CSI-RS port/delay/coefficient values (e.g., CSI-RS Port 1/Delay 1/Coefficient 1 and CSI-RS Port 2/Delay 2/Coefficient 2) per CSI-RS port group may be reported to the base station. For example, the number of combinations configured/indicated to the terminal may be defined to mean a minimum/maximum value that the terminal should/reports.

Additionally or alternatively, the base station may configure/indicated the terminal a range of delay values that may be reported per CSI-RS port group based on L1/L2 signaling (e.g., L1 signaling may include DCI, and L2 signaling may include MAC-CE elements). However, it is not limited to the above-described example, and the range of delay values reportable per CSI-RS port group may be defined between the base station and the terminal with a fixed rule.

Additionally or alternatively, the base station may configure/indicate the terminal the number of CSI-RS ports per CSI-RS port group based on L1/L2 signaling. However, it is not limited to the above example, and the number of CSI-RS ports per CSI-RS port group may be defined between the base station and the terminal with a fixed rule.

Additionally or alternatively, the 'range of delay values' and the 'number of CSI-RS ports' may be determined based on a report value of the terminal (e.g., UE capability). Specifically, the terminal may report specific values that may be used to determine the 'range of delay values' and the 'number of CSI-RS ports' to the base station. For example, the base station may define a new reporting quantity (e.g., cri-delay, etc.) in reporting config and may configure periodic/semi-persistent/aperiodic CSI-RS resources to receive reports from the terminal of CSI that may correspond to the 'range of delay values' and the 'number of CSI-RS ports'. The base station, based on the reported value of the terminal, may configure 'range of delay values' and 'number of CSI-RS ports' to 0 or 1 as in a high reciprocity environment by estimating/compensating for the reciprocity error between DL/UL channels.

Additionally or alternatively, the same value may be applied to the CSI-RS port(s) in the same CSI-RS port group, and the same/different values may be applied between CSI-RS ports corresponding to different CSI-RS port groups.

Additionally or alternatively, the 'number of CSI-RS ports' may have a different value or the same value per CSI-RS port group.

Additionally or alternatively, for the configuration/indication/definition of at least one of the 'range of delay values' or 'the number of CSI-RS ports', parameters related to this may be configured/indicated based on L1 signaling including DCI or L2 signaling including MAC-CE elements between the base station and the terminal, or may be defined by fixed rules.

Specifically, examples of parameters related to the 'range of delay values' may include a parameter related to a bandwidth for performing CSI calculation/a parameter related to the granularity of a precoding matrix within a bandwidth for performing CSI calculation/a parameter related to the total number of FD basis vectors. The base station/terminal may define a unit for a 'delay value range' based on the above parameters.

In addition, as an example of the parameter related to the 'number of CSI-RS ports', the total number of DFT basis vectors/the number of oversampling for the DFT basis vectors may be included. The base station/terminal may define a unit for 'number of CSI-RS ports' based on the above parameters.

FIG. 7 shows an example for DL/UL channels having different reciprocity.

In the case of FIG. 7(a), since there is almost no DL/UL reciprocity error, high reciprocity may be assumed for the DL/UL channel. Accordingly, in FIG. 7(a), the angle-delay pair corresponding to each DL/UL channel is the same, and only the coefficient for each pair is different. On the other hand, in FIG. 7(b), since there is a DL/UL reciprocity error, low reciprocity may be assumed for the UL/DL channel. FIG. 7(b) shows an example in which a difference occurs not only in coefficients for pairs corresponding to each DL/UL channel, but also in angle-delay values constituting a pair.

If it may assume a situation in which high reciprocity exists as shown in FIG. 7(a), the base station may perform a CSI measurement/reporting process for a DL channel using a UL channel value estimated based on UL sounding signaling. Specific examples related to this may be embodiment 3 and Exemplary Method 1 to be described later.

Exemplary Method 1

After defining beamformed CSI-RS ports 1/2/3, the base station may correspond each of the angle-delay pairs (θ, τ) 1/2/3 to the defined CSI-RS ports 1/2/3. For each CSI-RS port, after the base station may pre-compensate the delay value of the angle-delay pair corresponding to each CSI-RS port, and then based on the angle value of the angle-delay pair, the base station may transmit the CSI-RS to the terminal by selecting/applying a specific precoding matrix per CSI-RS port based on the angle value of the angle-delay pair. FIGS. 8 (a), (b), and (c) show an example in which delay values 1/4/7 are pre-compensated for each of CSI-RS ports 1/2/3 in the DL channel. That is, if pre-compensation of the delay value for each CSI-RS port is applied, the delay value of each CSI-RS port may be zero. For each CSI-RS port, the terminal may report the optimal coefficient corresponding to a delay value of 0 to the base station. Here, in the examples of FIGS. 8 (a), (b), and (c), each of the horizontal axis and the vertical axis may mean a delay and an angular domain as in the example of FIG. 7.

In the examples according to FIGS. 9 (a), (b), (c), and (d), it may be assumed that, after beamformed CSI-RS ports 1/2/3, 4/5/6, and 7/8/9 are defined, CSI-RS ports 1/2/3, CSI-RS ports 4/5/6, and CSI-RS ports 7/8/9 correspond to angle-delay pairs 1/2/3 respectively. CSI-RS ports 1/2/3, 4/5/6, and 7/8/9 may respectively correspond to CSI-RS port groups 1/2/3.

For convenience of explanation, in FIGS. 9(a), (b), (c) and (d), an example in which three CSI-RS ports are included in each CSI-RS port group will be described, but the technical scope of the present disclosure is not limited. Here, a specific CSI-RS port may correspond to a beam for transmission of a specific CSI-RS, and an angle of a beam for transmission of a specific CSI-RS may correspond to an angle of an angle-delay pair. Accordingly, the angle of the angle-delay pair may correspond to the CSI-RS port (i.e., the port index of the CSI-RS port). For example, each of CSI-RS ports 1/2/3 may correspond to one of angles 1/2/3.

The base station may correspond an angular-delay pair to each CSI-RS port group based on the UL channel estimation value. Here, since embodiments according to FIG. 9 (a), (b), (c), and (d) assume a situation in which low reciprocity occurs in DL/UL, the base station does not know the exact angle/delay value of the DL channel. Accordingly, the base station may configure/indicate the terminal the range of delay values reportable by the terminal per CSI-RS port group/the number of CSI-RS ports per CSI-RS port group to the terminal, based on at least one of the reported value of the terminal (e.g., (capability)) and the rule between the base station and the terminal.

Additionally or alternatively, the range of delay values reportable by the terminal per CSI-RS port group/the number of CSI-RS ports per CSI-RS port group may be defined based on a fixed rule between the base station and the UE.

FIGS. 9 (a), (b), (c), and (d) shows an example of a case where the range of delay values that may be reported by a terminal per CSI-RS port group is configured/indicated/defined as +/−1 and the number of CSI-RS ports per CSI-RS port group is configured/indicated/defined as 3. In the above example, it may be assumed that the delay value of the DL channel versus the UL channel value estimated by the base station based on the UL sounding signal may vary within +/−1, and the angle may vary within +/−1.

Additionally or alternatively, it may be necessary to define a unit of delay/angle between the base station and the terminal. To this end, as described in the above examples, parameters related to delay/angle units may be configured/indicated based on L1/L2 signaling between the base station and the terminal, or may be defined as a fixed rule. For example, when the total number of FD basis vectors is shared between the base station and the terminal, the unit of the delay value may be the unit of the FD basis vector. In addition, when the base station and the terminal share the total number of DFT basis vectors/the number of oversampling for the DFT basis vectors, the unit of angle may be the unit of all DFT basis vectors in which oversampling is reflected.

Next, based on the UL channel value estimated based on the range of the delay value/the number of ports per CSI-RS port group/UL sounding signal, and the like, the base station may pre-compensate for a specific delay value for each CSI-RS port(s) in the CSI-RS port group.

For example, in the case of the example shown in FIG. 9(a), it is assumed that the delay value range is +/−1 and the number of CSI-RS ports per CSI-RS port group is 3. Accordingly, the base station may pre-compensate for the same delay value for three CSI-RS ports for each CSI-RS port group. For example, the base station may pre-compensate for a delay value corresponding to 0/3/6 in consideration of a delay value range of +/−1 for each of the CSI-RS port groups 1/2/3. In other words, assuming that the delay value ranges from −t to +t based on the UL channel, the base station may pre-compensate for a delay value for a DL channel corresponding to (UL channel-t) (or assuming a DL channel). It may be seen that there is a difference between the above example and the case where the delay value corresponding to 1/4/7 is pre-compensated in the high reciprocity situation. The pre-compensated delay value may be assumed to be the same for CSI-RS port(s) in the same CSI-RS port group, and the same/different values may be assumed between CSI-RS ports corresponding to different CSI-RS port groups.

Next, for each CSI-RS port pre-compensated for the delay value, the base station may transmit the CSI-RS to the terminal by selecting/applying a specific precoding matrix per CSI-RS port based on at least one of the number of ports per CSI-RS port group or the UL channel value estimated based on the UL sounding signal, etc. In the case of the examples shown in FIG. 9 (a), (b), (c), and (d), it may be assumed that the number of CSI-RS ports per CSI-RS port group is 3, and it may be interpreted as assuming that the angle can vary within +/−1. Accordingly, for the three CSI-RS ports in each CSI-RS port group, the base station may select/apply a precoding matrix corresponding to an angle corresponding to a difference of +1/0/−1 compared to the angle value of the UL channel estimated based on the UL sounding signal, etc. and transmit the CSI-RS to the terminal.

Next, for each CSI-RS port group, the terminal may report the optimal coefficient (e.g., amplitude/phase) corresponding to the specific angle/delay value to the base station based on the DL channel value corresponding to the specific angle/delay value. For example, for each CSI-RS port group, the terminal may report the optimal coefficient corresponding to the preferred angle/delay value to the base station based on the DL channel value corresponding to the preferred angle/delay value. Here, since the base station may not be able to clearly identify which angle/delay value the coefficient reported by the terminal corresponds to, the terminal may report the angle (i.e., CSI-RS port)/delay value corresponding to the coefficient together with the coefficient to the base station.

When transmitting data to the terminal based on the angle (i.e., CSI-RS port)/delay/coefficient value per CSI-RS port group reported by the terminal, the base station receiving the reported value of the terminal may apply a specific precoding matrix/coefficient(s).

In embodiment 1, an environment in which a plurality of beamformed CSI-RS ports are configured/indicated within a single NZP CSI-RS resource is assumed. As an exemplary method for applying Embodiment 1, a method of corresponding 'CSI-RS port group' to 'NZP CSI-RS resource' may also be considered. For example, one or more CSI-RS port groups may correspond to one NZP CSI-RS resource.

Additionally or alternatively, the base station may configure/indicated the terminal to combine a NZP CSI-RS resource composed of one or more CSI-RS ports and an NZP CSI-RS resource composed of one or more NZP CSI-RS resources (e.g., an NZP CSI-RS resource set). The terminal may report L (L<=K) preferred NZP CSI-RS resources among the K NZP CSI-RS resources in the NZP CSI-RS resource combination and specific CSI-RS port (i.e., the port index of the CSI-RS port)/delay/coefficient value(s) (e.g., amplitude/phase) for each of the N NZP CSI-RS resources to the base station. FIG. 10 shows an example of a case where a 'CSI-RS port group' corresponds to a 'NZP CSI-RS resource'.

FIGS. 10 (b), (c), and (d) show examples of CSI-RS ports and DL channels corresponding to NZP CSI-RS resource 1. As shown in FIG. 10, NZP CSI-RS resource 1 may include 9 CSI-RS ports, and each CSI-RS port may correspond to a different angle/delay value. Based on the estimated UL channel, the base station may apply a specific angle value to each CSI-RS port in NZP CSI-RS resource 1 and perform pre-compensation for a specific delay value. For example, in FIGS. 10 (b), (c), and (d), it may be assumed that the pre-compensation operation of the same value is performed for i) ports 1/2/3, ii) ports 4/5/6, and iii) ports 7/8/9. Here, pre-compensation operations of different values may be performed (or applied) between i), ii), and iii).

And, in the examples according to FIGS. 10 (b), (c), and (d), within a single NZP CSI-RS resource, since the CSI-RS port for which pre-compensation is all performed (for possible delay value candidates) is defined, the base station may configure/indicate/define the terminal to report the optimal coefficient and CSI-RS port to the base station for a specific delay value (e.g., delay value 0/minimum delay value). For example, the terminal may report a specific coefficient (e.g., amplitude/phase) related to CSI-RS port 9 having the best coefficient at a delay value of 0 to the base station.

In addition, FIGS. 10(b), (c), and (d) shows an example in which CSI-RS ports in which pre-compensation is all performed (for candidates of possible delay values) are defined within a single NZP CSI-RS resource. Additionally or alternatively, the base station may configure/indicate/define to report a specific delay value corresponding to the optimal coefficient together (i.e., a specific delay value at which the optimal coefficient appears) after performing pre-compensation only for specific delay value candidates, when the terminal reports a specific CSI-RS port and optimal coefficient. For example, in NZP CSI-RS resource 1, only CSI-RS ports 1/2/3 may be defined. That is, the pre-compensation operation may be performed only for CSI-RS ports 1/2/3. At this time, when reporting a coefficient corresponding to delay value 2 in CSI-RS port 3, the terminal may also report that the coefficient corresponds to delay value 2.

FIG. 11 shows examples of CSI-RS ports and DL channels corresponding to NZP CSI-RS resources 2 and 3, assuming the situation of FIG. 10 (a). It may be seen in FIG. 11 that the same operations as in FIGS. 10 (b), (c), and (d) may be applied.

According to the existing terminal operation, when beam management (e.g., L1-RSRP/L1-SINR) is excluded when reporting CSI, the terminal may be defined to report only a single CSI-RS resource indicator (CRI). Additionally, according to an example of the present disclosure, reporting of one or multiple CRIs by a terminal may be supported. For example, the terminal may report specific CRI combinations/values to the base station. And, when reporting specific CRI combinations/values to the base station, the terminal may also report a CSI-RS port/delay value/coefficient (e.g., amplitude/phase) combination corresponding to each CRI.

Additionally or alternatively, a new criterion/threshold value for selecting a CRI to be reported to the base station may be introduced. For example, for multiple NZP CSI-RS resources set in a single CSI reporting configuration, if there is a port with an amplitude of (or exceeding) a specific threshold value within each resource, it may be defined to report the CRI corresponding to the resource.

According to the existing terminal operation, time domain characteristics (e.g., periodic/time behavior (e.g., periodic/semi-persistent/aperiodic)) for each NZP CSI-RS resource may be configured. In addition, a restriction to have the same time domain characteristics may be applied to a plurality of NZP CSI-RS resources corresponding to a single CSI reporting configuration. Additionally, according to examples of the present disclosure, it may be configured/indicated/defined to have different time domain characteristics (e.g., periodic/time behavior (e.g., periodic/time behavior (e.g., periodic/semi-continuous/aperiodic)) for a plurality of NZP CSI-RS resources configured in a single CSI reporting configuration.

When different time domain characteristics may be applied for each resource, the following advantages may be obtained. For NZP CSI-RS resource(s) that may assume high reciprocity between DL/UL based on the UL channel estimated by the base station, the resource may be transmitted in a short period, and for NZP CSI-RS resource(s) that may assume low reciprocity between DL/UL, resources may be transmitted in a long period. When resources corresponding to low DL/UL reciprocity are used for correcting DL/UL reciprocity errors between a base station and a UE, many resources may be wasted if resources are transmitted in a short period. However, according to the examples of the present disclosure, since time domain characteristics may be configured for each resource, unnecessary waste of resources may be prevented.

Embodiment 1-1

Embodiment 1-1 is an embodiment of a method for reporting a specific value (e.g., UE capability) that may be utilized to determine whether a new Type II port selection codebook (PSCB) is applied by a UE to a base station.

The new 'Type II PSCB' may include a method according to Embodiment 1, Exemplary Method 1, and/or embodiment 3 described below. More specifically, when the exemplary method 1 and embodiment 3 may be assumed to be PSCBs that may be applied in a high reciprocity environment and Embodiment 1 may be assumed as a PSCB that may be applied in a low reciprocity environment, information on whether the embodiments of the present disclosure are supported or up to which embodiment may be supported may be reported to the base station.

Embodiment 1-1-1

Embodiment 1-1-1 is an embodiment related to a method for reporting (i.e., fall-back mode) CSI assuming a specific codebook to a base station when an estimated channel does not satisfy a 'specific condition' from the viewpoint of a terminal when the base station configures/indicates the terminal to 'new Type II PSCB'.

An example of the 'specific condition' includes at least one of a case where the RSRP of the CSI-RS received through the beamformed CSI-RS port is lower than a specific threshold, a case in which the terminal determines that DL/UL reciprocity is not well matched based on the beam management process (BM), etc. or a case in which a valid DL channel value within the delay value range corresponding to each CSI-RS port group (e.g., above/exceeding a specific threshold value) is not obtained.

An example of the 'specific codebook' may include a previously defined Type II PSCB.

An example of the 'specific resource' may include part 1 CSI and the like. Part 1 CSI may be defined as follows.

In the case of Type I, Type II, and enhanced Type II CSI feedback for PUSCH, CSI reporting consists of two parts. Part 1 has a fixed payload size and is used to identify the number of information bits in Part 2. Part 1 must be transmitted in its entirety before Part 2.

For Type I CSI feedback, Part 1 includes RI (if reported), CRI (if reported), and CQI for the first code word (if reported). Part 2 includes the PMI (if reported) and the CQI for the second code word (if reported) when RI (if reported) is greater than 4.

For Type II CSI feedback, Part 1 includes an indication of the number of non-zero wideband amplitude coefficients per layer for RI (if reported), CQI, and Type II CSI. The fields of Part 1 (RI (if reported), CQI and number of non-zero wideband amplitude coefficients for each layer indicating) are separately encoded. Part 2 contains the PMI of Type II CSI. Parts 1 and 2 are encoded separately.

For enhanced Type II CSI feedback, Part 1 includes an indication of the total number of non-zero amplitude coefficients across layers for RI, CQI and enhanced type II CSI. The fields of Part 1 (RI, CQI, and indicating the total number of non-zero amplitude coefficients across the layers) are encoded separately. Part 2 contains the PMI of the enhanced Type II CSI. Parts 1 and 2 are encoded separately.

In addition to the above embodiment 1-1-1, if the base station determines that the channel/situation is difficult to operate with the 'new Type II PSCB', the base station may directly configure/indicate the terminal for the fall-back mode using MAC-CE/DCI.

Embodiment 2

Embodiment 2 is an embodiment of a method for informing the terminal of information on the strongest coefficient.

The base station may inform the terminal of information about the strongest coefficient based on L1/L2 signaling. Additionally or alternatively, the base station may inform the terminal of information on the strongest coefficient based on an implicit method.

In the case of the existing Type II codebook (including PSCB), the terminal may report information on the strongest coefficient to the base station. Further, the terminal may assume that the amplitude/phase value corresponding to the strongest coefficient is 1/0, respectively, and may determine the amplitude/phase of another coefficient value based on the strongest coefficient. In the case of a Type II codebook, the strongest coefficient may be defined as a parameter indicating a specific antenna port/beam for each of two or less layers. And, in the case of the enhanced Type II codebook, the strongest coefficient may be defined as a parameter indicating a specific antenna port/beam for each of 4 or less layers.

Meanwhile, when DL/UL (high/low) reciprocity may be assumed, the base station may estimate the expected strongest coefficient of the DL channel based on the UL channel estimated using the UL sounding signal. At this time, the base station may inform the terminal of information on the strongest coefficient. For example, the base station may map the strongest coefficient to a specific CSI-RS port (e.g., CSI-RS port 0), the mapping information may be configured/indicated to the terminal based on L1/L2 signaling and/or defined as a fixed rule between the base station and the UE.

For example, when the base station configures/indicates/defines information on the strongest coefficient to the terminal as described above, unlike the existing operation, the terminal may not separately report information on the strongest coefficient to the base station, and may report relative amplitude/phase values for other coefficients based on the strongest coefficient.

On the other hand, when the second embodiment is applied, a difference may occur between the UL channel estimated by the base station and the actual DL channel due to a DL/UL reciprocity error. In this case, the strongest coefficient configured/indicated/defined by the base station and the strongest coefficient measured by the terminal may be different. At this time, while reporting the CSI to the base station, the terminal may also report information to inform whether the strongest coefficient configured/indicated/defined by the base station and the strongest coefficient measured by the terminal are the same or different. For example, a 1-bit indicator is defined to inform whether the strongest coefficient configured/indicated by the base station and the strongest coefficient measured by the terminal are the same or different, the terminal may report a value corresponding to the defined 1-bit indicator to the base station. As another example, the terminal may report the difference between the strongest coefficient configured/indicated/defined by the base station and the strongest coefficient measured by the terminal to the base station. For example, the terminal may include the information in Part 1 CSI and report it to the base station.

In the above description, embodiments 1/1-1/1-1-1/2 may be applied independently or together.

Embodiment 3

Embodiment 3 is an embodiment for a method in which abase station configures/indicates a frequency domain (FD) basis vector(s) to a terminal.

The base station may configure/indicate the terminal of M (<=N, M is a natural number) specific DFT vectors among DFT vectors of size N (N is a natural number) to the terminal. And, the base station may configure/indicate related information (e.g. N value/M value/indices of selected DFT vectors/oversampling coefficient for deriving N/related coefficients for deriving the information, etc.) to the terminal through higher layer signaling and/or DCI signaling for this purpose.

The terminal may report CSI-related information (e.g., RI, PMI, etc.) to the base station based on the M specific DFT vectors.

In the above method, an example of 'DFT vectors of size N' is shown in Equation 8 below.

$$[e^{j2\pi(0)n/N} \ldots e^{j2\pi(N-1)n/N}]^T \text{ where } n=0, \ldots, N-1 \quad \text{[Equation 8]}$$

In Equation 8, 'size N' may be defined as N=Z×R based on size Z and oversampling coefficient R. Here, the size Z may mean the size (e.g., number of RBs, etc.) of a band configured for the UE to report/measure CSI.

In the above method, 'M specific DFT vectors' may be constructed by selecting M different n values in Equation 8 above. That is, various 'M specific DFT vectors' may be configured according to how M different n values are selected. Here, in the present disclosure, the M n values are not necessarily limited to continuous values, nor are they limited to values having a specific pattern.

As mentioned above, according to the operation of the existing terminal, to construct a Type II port selection codebook (PSCB), the base station may configure the number ($M_v$) of FD basis vectors per specific rank (i.e., RI) to the UE. However, $M_v$ FD basis vectors to be actually applied among all N3 vector candidates are defined to be reported by the terminal to the base station based on downlink channel information.

On the other hand, the present disclosure proposes a method for the base station to directly configure/indicate information on the FD basis vector combination to the terminal. That is, the base station may configure/indicate the terminal of M (<=N) specific DFT vectors among DFT vectors of size N to the terminal. Here, the M DFT vectors configured/indicated to the terminal may correspond to the FD basis vector combination. If delay reciprocity of the DL/UL channel between the base station and the terminal may be assumed, based on the UL channel estimated based on the signal transmitted by the terminal such as SRS, the base station may directly configure the FD basis vector combination to the terminal. The reason is that a delay in the time axis of the channel may appear as a phase rotation in the frequency axis. Equation 9 below shows an example of this characteristic. In Equation 9, and each is a channel gain and a time delay.

$$h(k) = \sum_{n=0}^{N_{path}-1} g_n e^{j2\pi k \delta_n / N_{FFT}} \quad \text{[Equation 9]}$$

Equation 9 shows an example of a channel coefficient value in the k-th subcarrier. As shown in Equation 9, channel coefficients (h(k)) for the entire band (k=0, . . . , $N_{FFT}-1$) may be expressed by FD basis vectors of $N_{path}$ ($[e^{j2\pi(0)\delta_n/N_{FFT}} \ldots e^{j2\pi(N_{FFT}-1)\delta_n/N_{FFT}}]^T$ where n=0, . . . , $N_{path}-1$) and amplitude/phase coefficients (amplitude/phase coefficients) ($g_n$) corresponding to the vectors. As can be seen in the above equation for the FD basis vector, each FD basis vector has a characteristic determined according to the value of $\delta_n$, which is a delay value of a channel, among all $N_{FFT}$ vector candidates. Accordingly, as described above, the base station may select the FD basis vector combination based on the delay value estimated from the UL channel, and directly configure/instruct the terminal the selected FD basis vector combination. Here, the base station may use higher layer signaling (e.g., RRC and/or MAC CE) and/or DCI signaling to configure/indicate the terminal to configure/indicate the FD basis vector combination.

Hereinafter, a method for configuring/indicating the FD basis vector combination to the terminal by the base station will be described. The embodiment described below may be one of the methods for applying the proposed method, and is not limited to the only method for applying the proposed method.

A method for a base station to configure/indicate an FD basis vector to a terminal 1) The base station may directly configure/indicate the terminal of M specific DFT vectors to be applied when the terminal reports CSI-related information (e.g., RI, PMI, etc.) to the base station.

A1-1) N-sized bitmaps may be defined for N DFT vector candidates. N DFT vector candidates may correspond to DFT vectors when n has a value from 0 to N−1 in Equation 8 above, and candidates of each DFT vector may be sequentially mapped to each bit of the bitmap on a one-to-one basis. Here, the order in which candidates of each DFT vector are mapped to each bit of the bitmap is in ascending order from 0 to N−1 of n, starting from the most significant bit (MSB)(or, leftmost bit) of the bitmap to the least significant bit (LSB)(or, right-most bit), or may be the reverse order.

In addition, the base station may configure/indicate the terminal of M DFT vectors using higher layer signaling (e.g., RRC and/or MAC CE) and/or DCI signaling using the bitmap. For example, if a specific bit value in the bitmap is 1, it may be interpreted that the DFT vector corresponding to the corresponding bit belongs to the M DFT vectors, or vice versa.

A1-2) For N DFT vector candidates, a bitmap corresponding to P less than or equal to N (i.e., a bitmap of P size) may be defined. Here, P≥M. The base station may configure/indicate the terminal of M DFT vectors using higher layer signaling (e.g., RRC and/or MAC CE) and/or DCI signaling using the bitmap. A method of configuring the P-size bitmap may be the same as the method of configuring the N-size bitmap described above except for the bitmap size.

The bitmap corresponding to P may mean consecutive P DFT vectors among N DFT vector candidates. Here, the P DFT vector candidates may correspond to DFT vectors according to P consecutive n values in Equation 8 above. That is, each bit of the P-sized bitmap may correspond to each DFT vector among P consecutive DFT vectors.

The consecutive P DFT vectors may be defined as a fixed rule between a base station and a terminal, or the base station may configure/indicate the terminal (e.g., configure/indicate a starting point (i.e., a specific n value)).

A1-3) The size of M may be determined by a fixed appointment between the base station and the terminal or configured to the terminal based on higher layer signaling (e.g., RRC/MAC CE). Starting points (i.e., a specific value of n) for M DFT vectors among N candidates may be configured/indicated to the UE using higher layer signaling (e.g., RRC and/or MAC CE) and/or DCI signaling. M DFT vectors may be defined/determined as consecutive DFT vectors (e.g., DFT vectors when n has a value from (the value configured as the starting point) to M−(the value configured as the starting point)) from the starting point.

2) The base station may configure/indicate the terminal of information about N' DFT vector candidates less than or equal to N among all N DFT vector candidates applicable when the terminal reports CSI-related information (e.g., RI, PMI, etc.) to the base station. In addition, the terminal may report M specific DFT vectors actually applied by the terminal among the N' DFT vector candidates to the base station.

A2-1) In the exemplary method below No. 2, as a method for a base station to configure/indicate information on N' candidates of N or less/not less than N' among all N candidates, the exemplary method described in No. 1 above (i.e., A1-1/A1-2/A1-3) may be applied. That is, although the exemplary method described in No. 1 (A1-1/A1-2/A1-3) assumes that M specific DFT vectors are directly indicated, when M is interpreted as N', the exemplary method described in No. 1 (i.e., A1-1/A1-2/A1-3) may be applied to the exemplary method No. 2 or less.

When the above-described embodiment 3 is applied, since the terminal may not report which DFT vectors to use as FD basis vectors to the base station, an advantage of reducing feedback overhead may be obtained.

The exemplary methods (A1-1/A1-2/A1-3/A2-1) described above may be one example of methods for applying the embodiment 1, and it is obvious that the exemplary methods (A1-1/A1-2/A1-3/A2-1) described above are not limited to the only method for applying Embodiment 1.

Embodiment 3-1: Configuration Method for Each Antenna Port

Regarding the above embodiment 3, the number M of specific DFT vectors and/or the selected M DFT vectors may have different values configured/indicated according to corresponding ports (e.g., a beamformed CSI-RS port). That is, the number M of specific DFT vectors and/or the selected M DFT vectors may be independently configured/indicated for each RS antenna port (e.g., CSI-RS antenna port).

Embodiment 3-1 may also be interpreted as the fact that the delay value/number of delays/window size for each delay may be independently configured/indicated to the terminal with respect to Embodiment 3 above. When the base station configures/indicates the above values to the terminal, it may be defined to consider only the strongest delay (s).

In order to apply the above proposal, the methods (A1-1/A1-2/A1-3/A2-1) described in Embodiment 3 above may be extended by the number of ports configured/indicated to the terminal.

In the case of the Type II port selection codebook (port selection codebook, PSCB), L ports (e.g., beamformed CSI-RS ports) per specific polarization (pole: polarization) are applied instead of the DFT vector. This is, if the base station may determine the spatial domain characteristics (e.g., angle value of the channel, etc.) of the DL channel based on the UL channel, after forming a beam in a corresponding direction and transmitting a reference signal (RS), it may be used to report and receive detailed amplitude/phase coefficients for configuring a precoding matrix from the terminal. In other words, in the case of a Type II PSCB, it may be composed of ports capable of corresponding to a specific beam and amplitude/phase coefficients corresponding to the corresponding ports.

Figure 12:
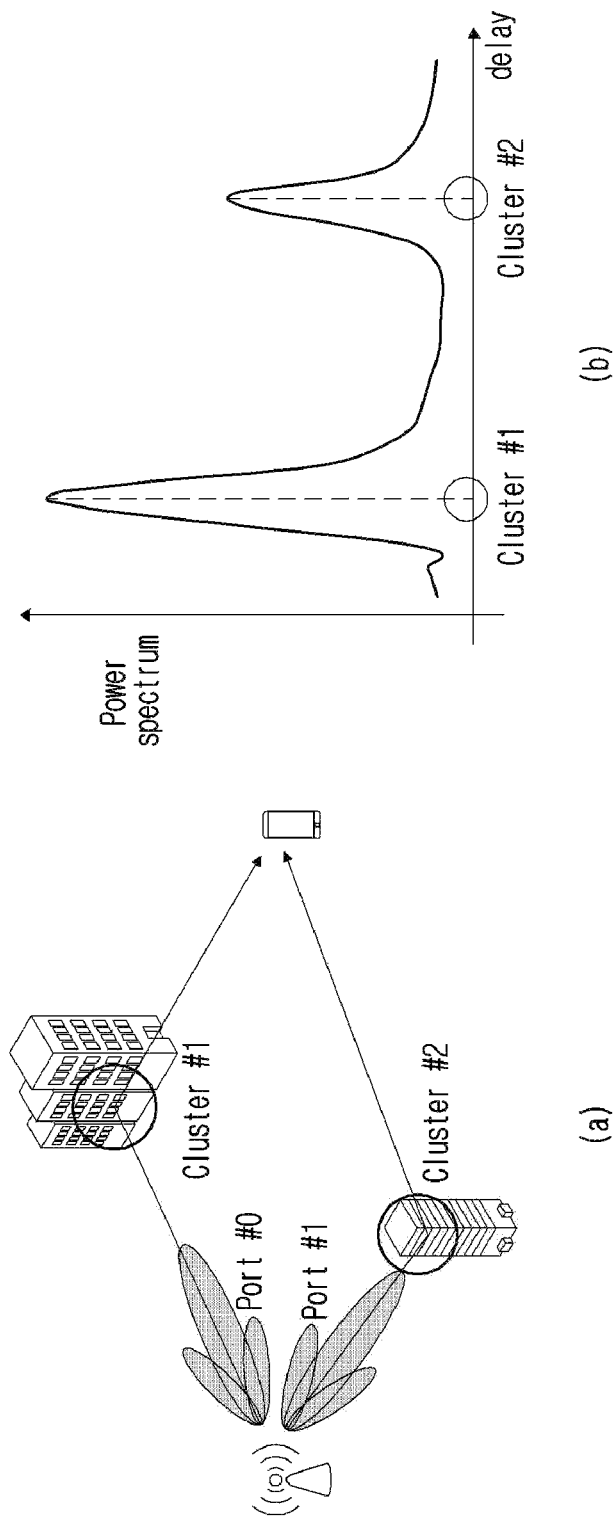
FIG. 12 is a diagram illustrating an example of a channel capable of utilizing a type II port selection codebook.

FIG. 12 is a diagram illustrating an example of a channel capable of utilizing a type II port selection codebook.

Referring to FIG. 12, the base station may obtain information (e.g., angle/delay value, etc.) on cluster #1/2 by estimating a UL channel based on SRS. In other words, the base station may transmit beamformed CSI-RSs in each direction. Then, the terminal may derive amplitude/phase coefficients for each beamformed CSI-RS port (port #0/1) based on the corresponding RS and report them to the base station. In Rel-16 Type II PSCB, it is defined that a terminal reports amplitude/phase coefficients to a base station based on the same number of identical FD basis vectors for different ports. Taking the channel shown in FIG. 12 as an example, it may be interpreted that two FD basis vectors corresponding to cluster #1 and cluster #2 are defined, and amplitude/phase coefficients corresponding to the two FD basis vectors are reported for each port.

Meanwhile, based on the above-described embodiment 3, the base station may configure/indicate the terminal to M specific DFT vectors to be applied as FD basis vectors to the terminal based on delays corresponding to cluster #1/2. Through this, since the terminal may not report which DFT vectors are to be used as FD basis vectors to the base station, an advantage of reducing feedback overhead may be obtained.

However, in spite of these advantages, when the number of oversampling is increased to perform more detailed precoding in the frequency domain, the channel is also subdivided in the time domain. Therefore, the number (M) of DFT vectors to be configured/indicated to the terminal for FD basis vector configuration/indication increases. As a result, the amount of information to be reported by the terminal to the base station also increases as M increases. As a method for overcoming these disadvantages, the above-described embodiment 1-1 may be applied. That is, different values may be configured/indicated depending on the number M of specific DFT vectors and/or the selected M DFT vectors according to the corresponding port (e.g., beamformed CSI-RS port).

Figure 13:
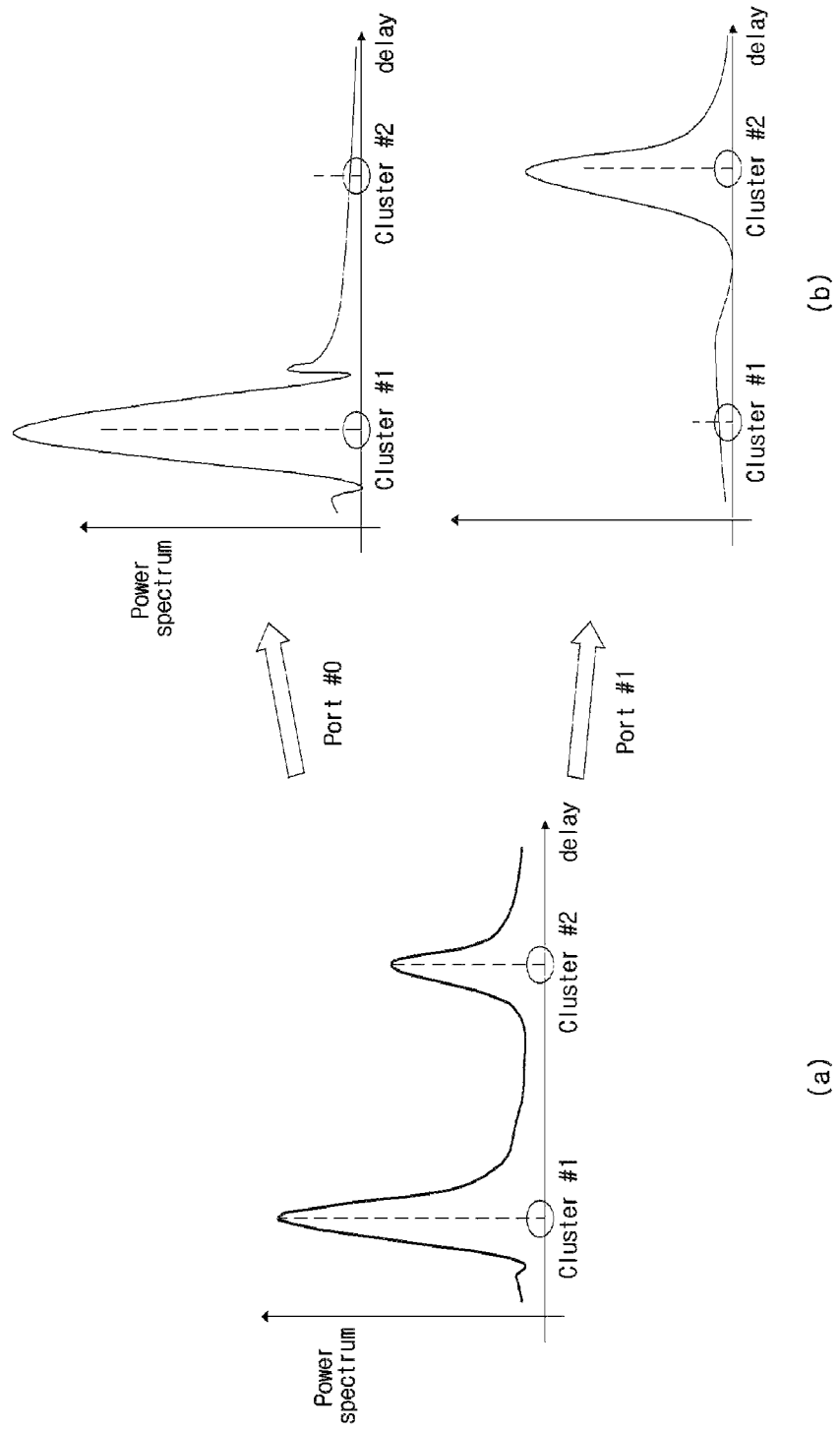
FIG. 13 is a diagram illustrating a channel change when an embodiment of the present disclosure is applied.

FIG. 13 is a diagram illustrating a channel change when an embodiment of the present disclosure is applied.

FIG. 13 shows an example of a channel before beamforming and a channel after transmission beamforming (TX beamforming) of a base station. FIG. 13(a) shows a channel between a base station and a terminal before beamforming. On the other hand, FIG. 13(b) shows a channel changed according to the beamforming of the base station. In FIG. 13, the channel for port #0 shows an example of a channel when beamforming is performed in the direction of cluster #1, and the channel for port #1 shows an example of a channel when beamforming is performed in the direction of cluster #2.

As can be seen in FIG. 13, it may be expected that the power spectrum of a cluster in a beam direction increases due to the beamforming of the base station, while the power spectrum of a cluster in a different beam direction decreases. This tendency may be expected to be more pronounced when the beam width of the base station is reduced. Meanwhile, due to the above characteristics, different ports may eventually correspond to different clusters, and it may be effective for different ports to have different combinations of FD basis vectors according to delay value characteristics of clusters.

As described above, a specific port (beamformed CSI-RS port) may correspond to a specific direction (or cluster). Therefore, it may also correspond with specific delay(s) corresponding to the corresponding direction (or cluster). Based on these characteristics, the base station may configure/indicate the number M of specific DFT vectors and/or M different DFT vectors for each port (e.g., beamformed CSI-RS port) independently for FD basis vector combination of the terminal.

In this case, even if the channel is subdivided in the time domain by increasing the number of oversampling to perform more detailed precoding in the frequency domain, different FD basis vectors may be configured/indicated for each port. Accordingly, an increase in the amount of information to be reported by the terminal to the base station may be prevented/mitigated, and performance improvement using frequency selectivity may be expected.

Meanwhile, the above-described embodiment 3/3-1 may be limitedly applied to a case where a DL carrier and a UL carrier constituting one component carrier (CC) are within a specific frequency range (e.g., the same band). Additionally/alternatively, it may be limitedly applied when the terminal reports to the base station that it supports a specific terminal characteristic (e.g., the proposed operation of embodiment 3/3-1, FDD reciprocity, etc.) (e.g., when the terminal reports that the receiving antenna/RF configuration (or Rx (reception) beamformer configuration) and the transmitting antenna/RF configuration (or Tx (transmission) beamformer configuration) for the corresponding DL-UL pair are the same/similar).

Embodiment 3-2: Rx Beam Configuration Method for Terminal to Receive CSI-RS

When the base station transmits the CSI-RS for CSI measurement of the terminal to the terminal, the base station may configure/indicate related SRS information (e.g., SRS resource identifier (identifier, ID)/UL BWP ID/UL CC ID, etc.) and/or PUCCH/PUSCH resource information (e.g., PUCCH resource ID/PUCCH-SpatialRelationInfoId, etc.) for Rx beam configuration for the terminal to receive CSI-RS.

Here, the Rx beam configuration method may be limitedly applied when the DL carrier and the UL carrier constituting one CC are within a specific frequency range (e.g., the same band). And/or it may be limitedly applied when the terminal reports to the base station that it supports a specific terminal characteristic (e.g., the proposed operation of the embodiment 3/3-1 or FDD reciprocity, etc.) (e.g., when the terminal reports that the receiving antenna/RF (radio frequency) configuration (or Rx (reception) beamformer configuration) and the transmitting antenna/RF configuration (or Tx (transmission) beamformer configuration) for the corresponding DL-UL pair are the same/similar).

The following content shows how the base station configures/indicates the terminal to receive information for the terminal to receive the CSI-RS when the base station transmits the CSI-RS for CSI measurement to the terminal.

For one CSI-RS resource in the NZP-CSI-RS-ResourceSet configured without the higher layer parameter trs-Info and without the higher layer parameter repetition, the terminal expects the TCI-State to indicate one of the following quasi co-location (QCL) type(s):

'QCL-Type A' with one CSI-RS resource in the NZP-CSI-RS-ResourceSet in which the higher layer parameter trs-Info is configured and, if applicable, 'QCL-Type D' with the same CSI-RS resource; or 'QCL-Type A' with one CSI-RS resource in the NZP-CSI-RS-ResourceSet in which the higher layer parameter trs-Info is configured and, if applicable, 'QCL-Type D' with the SS/PBCH block, or 'QCL-Type A' with one CSI-RS resource in the NZP-CSI-RS-ResourceSet in which the higher layer parameter trs-Info is configured, and, if applicable, 'QCL-Type D' with one CSI-RS resource in the NZP-CSI-RS-ResourceSet in which the higher layer parameter repetition is configured, or 'QCL-Type B' with one CSI-RS resource in the NZP-CSI-RS-ResourceSet in which the higher layer parameter trs-Info is configured if 'QCL-Type D' is not applicable.

Here, 'QCL-TypeD' means information on the reception beam of the terminal (i.e., spatial reception parameter (Spatial Rx parameter)) as defined in the standard. That is, it may be interpreted as meaning to apply the same spatial reception parameters as when receiving an RS set to QCL-TypeD.

According to this embodiment, the base station may apply SRS information (e.g., SRS resource ID/BWP ID, etc.) to configure/indicate reception beam information to be applied when the terminal receives the CSI-RS for CSI measurement. That is, specific SRS information may be configured/indicated in the QCL-TypeD. In other words, for a CSI-RS (resource), QCL-TypeD with a specific SRS (resource) may be configured/indicated.

If SRS information is configured/indicated in QCL-TypeD, the terminal may interpret this to mean receiving the CSI-RS with the same beam (e.g., Spatial Rx parameter) as the transmission beam applied (e.g., spatial transmission parameter/spatial domain transmission filter, etc.) when transmitting the corresponding SRS.

In the above proposed method, a method of configuring/indicating specific SRS information in QCL-TypeD has been described, but this may be seen as an example for performing the operation proposed in this embodiment, and is not limited to a unique operation.

As an example of another method, SRS may be added as a spatial RS, associated RS, quasi-co-beam RS, or transmission configuration indication (TCI) for the corresponding CSI-RS. The methods for supporting embodiment 3-2 described above may have a feature that information on a specific SRS resource may be utilized for receiving a specific CSI-RS resource.

As described above, when the SRS information transmitted by the terminal is used to receive the CSI-RS for CSI measurement, the following advantages may be obtained.

In order to configure a spatial domain transmission filter for transmitting the SRS, the terminal may refer to SRS-SpatialRelationInfo configured in units of SRS resources. RSs that may be configured in SRS-SpatialRelationInfo include SSB/NZP CSI-RS/SRS. The base station must change the SRS-SpatialRelationInfo value using RRC signaling in order to change the spatial domain transmission filter applied by the terminal to SRS transmission.

Meanwhile, the base station may configure reception beam related information to the terminal through QCL-TypeD configuration for each corresponding CSI-RS resource in order to receive the CSI-RS for CSI measurement of the terminal. The base station must change the QCL-TypeD value using RRC signaling in order to change the spatial domain receiver filter applied when the terminal receives the CSI-RS.

On the other hand, when SRS information may be used for the QCL-TypeD configuration as in the above-described embodiment 3-2, by changing only SRS-SpatialRelationInfo configured in the SRS resource, the reception beam information to be applied to CSI-RS reception may also be changed at once (at the same time). That is, there is no need to separately change the QCL-TypeD value.

Accordingly, there is an advantage in that signaling overhead and latency for changing the reception/transmission beam of the terminal may be reduced. In addition, when considering DL/UL channel reciprocity in FDD, since the base station may transmit CSI-RS based on a specific SRS resource transmitted by the terminal, the present embodiment 3-2 may be useful in this environment.

Embodiment 3-2-1: Default Reference Resource Configuration

It is assumed that the QCL-TypeD RS (reference resource) of a specific CSI-RS resource is configured to specific SRS information (or PUCCH/PUSCH resource information) (i.e., the previous embodiment 3-2). Here, when the offset between the time when the SRS corresponding to the specific SRS information is transmitted (most recently) and the time when the specific CSI-RS resource is transmitted (most recently) exceeds a specific value (e.g., threshold A (threshold A)), when receiving the specific CSI-RS resource, it may be assumed that the QCL-TypeD RS is a 'default reference resource'.

Here, the 'default reference resource' may correspond to any one of a specific CSI-RS resource (e.g., CSI-RS resource for channel measurement (CM), CSI-RS resource for beam management (BM), TRS, etc.)/SSB/SRS/PUCCH/PUSCH resource.

In this embodiment, when the QCL-TypeD RS of a specific CSI-RS resource is configured to specific SRS information, it may be interpreted as follows. That is, this may be the case when the base station estimates the UL channel based on the specific SRS information, configures beamformed CSI-RS port based on this, and performs (obtains) CSI feedback based on the beamformed CSI-RS port. In this case, as the interval between the time the base station receives the SRS and the time it transmits the CSI-RS increases, the difference between the UL channel measured by the base station through the SRS and the DL channel measured by the terminal through the CSI-RS may increase (outdated). In this way, when a large difference occurs between the transmission time of a specific SRS configured as the QCL-TypeD RS of the CSI-RS resource and the transmission time of the actual CSI-RS, the base station may use another UL signal (e.g., another SRS/PUCCH/PUSCH, etc.) to configure a beamformed CSI-RS port corresponding to the CSI-RS. In this case, the QCL-TypeD RS of the CSI-RS resource must be able to be configured to a UL signal used for beamformed CSI-RS port configuration. According to this embodiment, as described above, when the offset between the SRS transmission time and the CSI-RS transmission time exceeds a specific value, before the CSI-RS is transmitted, the terminal may be configured/indicated by the base station to transmit a specific RS. And, the specific RS may be configured as a QCL-TypeD RS of CSI-RS resources. Based on this embodiment, mismatch between a UL channel and a DL channel may be minimized.

Embodiment 4

For reporting settings configured in different cells (or carriers), CSI feedback overhead for the reporting settings may be reduced based on correlation between CSIs for each reporting selling.

Table 6 below illustrates some of the reporting setting (eg, CSI-ReportConfig) parameters.

TABLE 6

```
-- ASN1START
-- TAG-CSI-REPORTCONFIG-START
CSI-ReportConfig ::=                    SEQUENCE {
    reportConfigId                          CSI-ReportConfigId,
    carrier                                 ServCellIndex
OPTIONAL,   -- Need S
    resourcesForChannelMeasurement          CSI-ResourceConfigId,
    csi-IM-ResourcesForInterference         CSI-ResourceConfigId
OPTIONAL,   -- Need R
    nzp-CSI-RS-ResourcesForInterference     CSI-ResourceConfigId
OPTIONAL,   -- Need R
    reportConfigType                        CHOICE {
        periodic                                SEQUENCE {
            reportSlotConfig                        CSI-
ReportPeriodicityAndOffset,
            pucch-CSI-ResourceList                  SEQUENCE (SIZE
(1..maxNrofBWPs)) OF PUCCH-CSI-Resource
        },
        semiPersistentOnPUCCH                   SEQUENCE {
            reportSlotConfig                        CSI-
ReportPeriodicityAndOffset,
            pucch-CSI-ResourceList                  SEQUENCE (SIZE
(1..maxNrofBWPs)) OF PUCCH-CSI-Resource
        },
```

Referring to Table 6, the reporting setting is linked to a specific serving cell (see carrier field). Here, when calculating/obtaining/reporting DL CSI based on FDD reciprocity, this reciprocity characteristic may be similarly applied to multiple cells. In this case, CSI for a plurality of cells may have mutual similarity, and based on this, overhead in CSI feedback for different cells may be reduced.

For example, when report settings for cell #1/cell #2 are defined as report #1/report #2, it may be assumed that report #1 and report #2 have the same CSI. In this case, only CSI corresponding to a specific report among report #1/#2 may be defined/configured to be reported. And/or, assuming that report values corresponding to wideband (WB) are the same for report #1/#2, the WB CSI may be reported only in CSI corresponding to a specific report among the two reports. Here, a report value corresponding to a subband (SB) may be reported for each report #1/#2.

Figure 14:
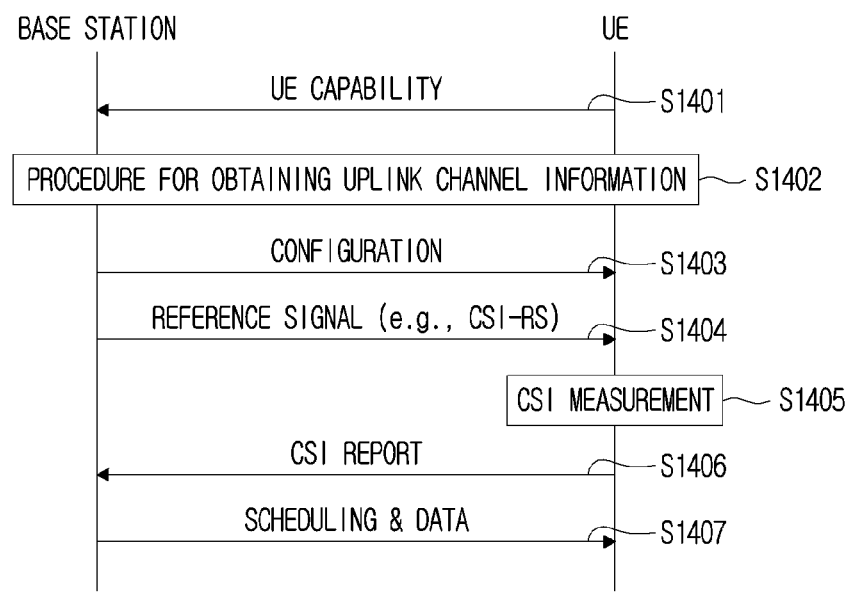
FIG. 14 is a diagram illustrating a signaling method between a base station and a terminal for transmitting and receiving channel state information according to an embodiment of the present disclosure.

FIG. 14 is a diagram illustrating a signaling method between a base station and a terminal for transmitting and receiving channel state information according to an embodiment of the present disclosure.

FIG. 14 represents an example of signaling between UE and a network side to which the above-described embodiments of the present disclosure (e.g., at least one of embodiment 1/1-1/1-1-1, embodiment 2, embodiment 3/3-1/3-2, or embodiment 4 etc.) may be applied. Here, the UE/base station is just one example, and may be implemented in various devices. FIG. 14 illustrates a signaling flowchart for convenience of description of the present disclosure, and does not limit the scope of the present disclosure. In addition, some of the step(s) illustrated in FIG. 14 may be omitted depending on circumstances and/or settings.

In the following description, a base station may be one base station including a plurality of TRPs, or may be one cell including a plurality of TRPs. For example, an ideal/non-ideal backhaul may be established between TRP 1 and TRP 2 constituting one base station. In addition, although the following description is based on a plurality of TRPs, it may be equally extended and applied to transmission through a plurality of panels/cells.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID). In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.). In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

Referring to FIG. 14, the UE may transmit terminal capabilities to the base station (S1401). That is, the base station may receive the UE capability from the UE. For example, the UE capability may include capability information of the UE for the operations/methods described in the above-described embodiment (e.g., one or more of embodiments 1/1-1/1-1-1, embodiment 2, embodiments 3/3-1/3-2, or embodiment 4). For example, the UE capability may include information on the range of delay values supported by the UE for each CSI-RS port group/number of CSI-RS ports. For example, the UE capability may include information on whether a new type II port selection codebook may be applied. In some cases, the operation of the terminal reporting the UE capability may be omitted.

The above-described step of FIG. 14 may be implemented by a first device 100 and a second device 200 of FIG. 17 to be described below. The UE may be implemented as the first device 100 and the base station may be implemented as the second device 200 or vice versa. For example, referring to FIG. 17, one or more processors 102/202 may control one or more transceivers 106/206 and/or one or more memories 104/204 to transmit UE capabilities, and one or more transceivers 106/206 may transmit UE capabilities from a base station.

The UE may perform a procedure for obtaining uplink channel information with the base station (S1402).

For example, the procedure for obtaining uplink channel information may include receiving configuration/indication values for SRS transmission by the UE from the base station (or network side), transmitting, by the UE, an SRS to the base station according to the set value, and estimating uplink channel information based on the SRS received by the base station.

For example, the procedure for obtaining uplink channel information between the UE and the base station in step S1402 described above may be implemented by the apparatus of FIG. 17 to be described below. For example, referring to FIG. 17, one or more processors 102 may control one or more transceivers 106 and/or one or more memories 104 to perform an uplink channel information acquisition procedure.

The UE may receive configuration from the base station (S1403). The configuration may include system information (SI) and/or scheduling information and/or BM-related configuration (e.g., DL BM related CSI-ResourceConfig IE/NZP CSI-RS resource set IE, etc.) and/or CSI-related configuration (e.g., CSI-IM (interference management) resource related information/CSI measurement configuration related information/CSI resource configuration related information/CSI-RS resource related information/CSI reporting configuration related information, etc.). The configuration may be transmitted to a higher layer (e.g., RRC or MAC CE)/DCI. In addition, when the configuration is defined or configured in advance, the corresponding step may be omitted.

For example, the configuration may include information for performing CSI measurement. For example, the configuration may include configuration/indication information described in the above-described method (e.g., at least one of embodiment 1/1-1/1-1-1, embodiment 2, embodiment 3/3-1/3-2, or embodiment 4). For example, the configuration may include information on one or more CSI-RS ports/ information on one or more CSI-RS port groups/CSI-RS resource configuration/CSI-RS resource set configuration/ reportable delay range for each CSI-RS port group/number of CSI-RS ports. For example, the configuration may include configuration for a new PSCB/information on the strongest coefficient.

For example, an operation in which the UE (100 or 200 of FIG. 17) receives the configuration from the base station (100 or 200 of FIG. 17) in step S1403 described above may be implemented by the device of FIG. 17 to be described below. For example, referring to FIG. 17, one or more processors 102 may control one or more transceivers 106 and/or one or more memories 104, etc. to receive the configurations, and one or more transceivers 106 may receive the configurations from a base station.

The UE may receive a reference signal from the base station (S1404). That is, the base station may transmit a reference signal to the UE. For example, the reference signal may be a reference signal for CSI measurement (e.g., CSI-RS). For example, the reference signal may be received based on the configuration. For example, the reference signal may be received based on the configuration/indication described in the above method. For example, the reference signal may be received based on a CSI-RS port group, and the base station may transmit the CSI-RS to the UE by selecting/applying a specific precoding matrix for each CSI-RS port based on the angle value of the angle-delay pair after pre-compensating the delay value of the angle-delay pair corresponding to each port. For example, for each CSI-RS port pre-compensated for the delay value, a specific precoding matrix is selected/applied to each CSI-RS port based on the UL channel value estimated by the base station based on the number of ports per CSI-RS port group/UL sounding signal, etc., so that the UE may receive the CSI-RS.

For example, the above-described operation of receiving the reference signal from the base station by the UE in step S1404 may be implemented by the apparatus of FIG. 17 to be described below. For example, referring to FIG. 17, one or more processors 102 may control one or more transceivers 106 and/or one or more memories 104 to receive the reference signals, and one or more transceivers 106 may receive the reference signals from a base station.

The UE may perform CSI measurement based on the received reference signal (e.g., CSI-RS) and a previously configured/indicated value (e.g., configuration) (S1405). For example, the CSI measurement may be performed based on the above method (e.g., at least one of embodiments 1/1-1/1-1-1, embodiment 2, embodiments 3/3-1/3-2, or embodiment 4). For example, CSI measurement may be performed based on a codebook.

For example, an operation in which the UE (100 or 200 of FIG. 17) performs CSI measurement in the above-described step S1405 may be implemented by the device of FIG. 17 to be described below. For example, referring to FIG. 17, one or more processors 102 may control one or more transceivers 106 and/or one or more memories 104 to perform the CSI measurement.

The UE may transmit CSI to the base station (S1406). That is, the base station may receive the CSI report from the UE. For example, the CSI report may be transmitted through an uplink channel (e.g., PUCCH/PUSCH). For example, the CSI report may be reported as one of periodic/semi-persistent/non-periodic. For example, the CSI may include a CSI parameter calculated based on the method described above (e.g., at least one of embodiments 1/1-1/1-1-1, embodiments 3/3-1/3-2, or embodiment 4). For example, the CSI may include specific port/delay/angle/coefficient (e.g., amplitude/phase) value(s) corresponding to each CSI-RS port group. For example, the CSI may include L (L<=K) preferred NZP CSI-RS resources among K NZP CSI-RS resources in the NZP CSI-RS resource combination and specific port/delay/coefficient (e.g. amplitude/phase) value(s) corresponding to each NZP CSI-RS resource. For example, a specific coefficient (amplitude/phase) may be reported for a CSI-RS port having the best coefficient at a delay value of 0. For example, the CSI may include multiple CRIs, and a port/delay/coefficient (e.g., amplitude/phase) combination corresponding to each CRI may be reported together. For example, the CSI may include specific codebook information used by the UE for CSI measurement. For example, the CSI may be reported including amplitude/phase values relative to other coefficients to be reported by the UE based on the strongest coefficient transmitted by the base station.

For example, an operation in which the UE (100 or 200 in FIG. 17) reports the CSI to the base station (100 or 200 in FIG. 17) in step S1406 may be implemented by the device of FIG. 17 to be described below. For example, referring to FIG. 17, One or more processors 102 may control one or more transceivers 106 and/or one or more memories 104 to transmit the CSI, and one or more transceivers 106 may transmit the CSI from a base station.

The base station may schedule and transmit data based on the CSI report of the UE (S1470). That is, the UE may receive scheduling and reception of data from the base station.

Figure 15:
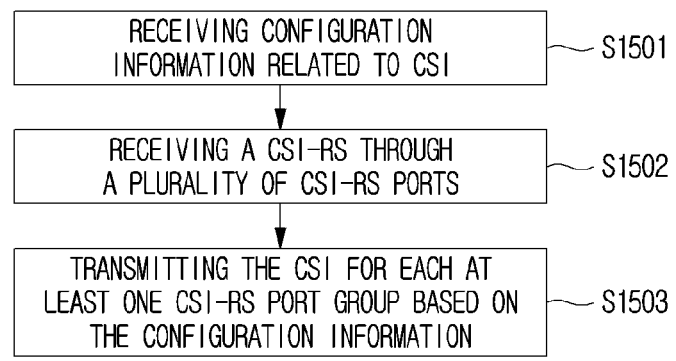
FIG. 15 is a diagram illustrating a method of transmitting channel state information according to an embodiment of the present disclosure.

FIG. 15 is a diagram illustrating a method of transmitting channel state information by a UE according to an embodiment of the present disclosure.

Each step of FIG. 15 to be described below may be implemented by the first device 100/second device of FIG. 17 to be described later.

Referring to FIG. 15, the UE may receive configuration information related to CSI from the base station (S1501).

The configuration information related to CSI may include at least one of a range of delay values for each at least one CSI-RS port group or information about the number of CSI-RS ports included in at least one CSI-RS port group. Here, at least one CSI-RS port group may include at least one CSI-RS port. When different configuration information is received for each CSI-RS port group in a situation where DL/UL reciprocity is not strong, since the UE may perform an operation suitable for each CSI-RS port group (e.g., an operation of generating reporting information optimized for each CSI-RS port, etc.), the overall flexibility of the wireless system may be improved.

At least one of the range of delay values for each CSI-RS port group or the number of CSI-RS ports included in the CSI-RS port group may be determined based on at least one of information related to the capability of the UE, the number of CSI-RS ports to be included in the CSI-RS port group, or a specific value required to determine the delay value range. To this end, the UE may periodically/semi-persistently/non-periodically transmit at least one of information related to the capability of the UE, the number of CSI-RS ports to be included in the CSI-RS port group, or a specific value required to determine a delay value range to the base station.

In addition, configuration information related to CSI may include a port index of a CSI-RS port to be reported for each at least one CSI-RS port group, delay value, and information related to combinations of one or more of the coefficients (e.g., number of combinations, etc.). For example, the number of combinations of the port index, delay value, and coefficient of the CSI-RS port is 1 may mean that a combination of a port index, a delay value, and a coefficient of one CSI-RS port may be reported for each CSI-RS port group. That is, the number of combinations of one or more of the port index, delay value, and coefficient of the CSI-RS port included in the configuration information related to CSI may be defined to mean a minimum or maximum value of a combination of at least one of a port index, a delay value, and a coefficient of a CSI-RS port to be reported or reportable by the UE.

Additionally or alternatively, as described in embodiment 1 above, at least one CSI-RS port group may correspond to at least one NZP CSI-RS resource, respectively. In addition, configuration information related to CSI may include information for configuring K (K is a natural number) NZP CSI-RS resources including at least one CSI-RS port and NZP CSI-RS resource sets including NZP CSI-RS resources.

In addition, configuration information related to CSI may include information for configuring each of the K NZP CSI-RS resources to have different time domain characteristics. The time domain feature may include, for example, at least one of periodic, semi-persistent, or aperiodic features.

The UE may receive the CSI-RS from the base station through a plurality of CSI-RS ports (S1502). Here, a plurality of CSI-RS ports may be grouped into at least one CSI-RS port group as described above.

The base station may pre-compensate for a specific delay value for a CSI-RS port included in at least one CSI-RS port group before transmitting the CSI-RS. The pre-compensated delay value may be determined based on a delay range for each CSI-RS group including at least one CSI-RS port or predefined according to a rule between the base station and the UE.

The UE may receive, through at least one CSI-RS port for which the delay value is pre-compensated, the transmitted CSI-RS from the base station based on the number of CSI-RS ports included in each CSI-RS port group and the uplink channel estimation value. For example, a situation in which the number of CSI-RS ports per CSI-RS port group is 3 may be interpreted as that the CSI-RS port (i.e., angle) may vary within ±1. The UE may receive, based on the uplink sounding signal, etc., a CSI-RS from the base station to which a precoding matrix corresponding to a CSI-RS port corresponding to a difference of +1/0/−1 compared to the CSI-RS port value of the uplink channel estimated by the base station is applied.

The UE may transmit CSI to the base station for each at least one CSI-RS port group based on the configuration information (S1503).

Here, the CSI may include at least one of a port index, a delay value, or a coefficient (e.g., phase or/and amplitude, etc.) for each of one or more specific CSI-RS ports per at least one CSI-RS port group.

For example, the UE, based on one or more specific CSI-RS ports (i.e., angles) for each CSI-RS port group and a downlink channel value corresponding to the delay value of the one or more specific CSI-RS ports, may transmit CSI including one or more optimal coefficients corresponding to one or more specific CSI-RS ports/delay values to the base station. At this time, the base station may not clearly know which CSI-RS port and delay value the coefficient transmitted by the UE corresponds to. Accordingly, when transmitting at least one or more coefficients for each CSI-RS port, the UE may transmit CSI including the port index and delay value of the CSI-RS port corresponding to the one or more coefficients.

Through the above-described method, the UE may perform the most suitable reporting operation in units of CSI-RS port groups, and thus, efficiency may be improved by lowering reporting overhead. In addition, in a situation where DL/UL reciprocity is low, the UE may report preferred coefficient information from the viewpoint of the UE in units of CSI-RS port groups, and thus may perform a reporting operation more suitable for the channel environment.

And, the UE may receive downlink from the base station through the precoding matrix and coefficients determined based on port indexes of one or more CSI-RS ports per CSI-RS port group, and delay values and coefficients of the one or more CSI-RS ports. That is, the UE may receive data transmitted by the base station through the precoding matrix and coefficient determined based on the reported CSI.

Additionally or alternatively, the CSI may include one or more CSI-RS resource indicators (CRI). For example, the UE may transmit CSI including a combination of a specific CRI combination/value and a port index of a CSI-RS port corresponding to the specific CRI combination/value, a delay value, and a combination of coefficients to the base station.

The UE may transmit CSI including L (K≥L, L is a natural number) NZP CSI-RS resources among K NZP CSI-RS resources, a port index of each of one or more specific CSI-RS ports for each L NZP CSI-RS resource, at least one of delay values or coefficients associated with each specific CSI-RS port for each of the L NZP CSI-RS resources, and CRI corresponding to each of the L NZP CSI-RS resources to the base station.

Here, a new criterion or threshold may be introduced to select a specific CRI combination/value when transmitting CSI to the base station. For example, if there is a CSI-RS port having an amplitude equal to or greater than a specific threshold in the first NZP CSI-RS resource among K NZP CSI-RS resources, the UE may transmit CSI including the CRI corresponding to the first NZP CSI-RS to the base station.

Figure 16:
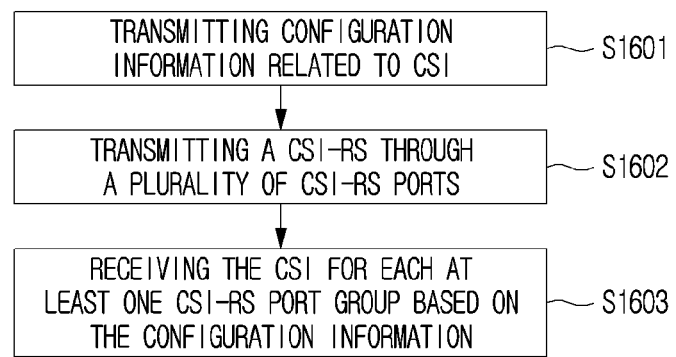
FIG. 16 is a diagram illustrating a method of receiving channel state information according to an embodiment of the present disclosure.

FIG. 16 is a diagram illustrating a method for a base station to receive channel state information according to an embodiment of the present disclosure.

Each step of FIG. 16 described below may be implemented by the first device 100/second device 200 of FIG. 17 to be described later.

Referring to FIG. 16, the base station may transmit configuration information related to CSI to the UE (S1601).

The configuration information related to CSI may include at least one of a range of delay values for each at least one CSI-RS port group or information about the number of CSI-RS ports included in at least one CSI-RS port group. Here, at least one CSI-RS port group may include at least one CSI-RS port.

In situations where DL/UL reciprocity is not strong, when the base station transmits different configuration information for each CSI-RS port group, since the UE can perform an operation suitable for each CSI-RS port group (e.g., an operation of generating reporting information optimized for each CSI-RS port, etc.), the overall flexibility of the wireless system may be improved.

Additionally or alternatively, the base station may periodically/semi-persistently/non-periodically receive at least one of information related to the capability of the UE, the number of CSI-RS ports to be included in the CSI-RS port group, or a specific value required to determine a delay value range from the UE. And, based on at least one of the information related to the capability of the received UE, the number of CSI-RS ports to be included in the CSI-RS port group, or a specific value required to determine a delay value range, the base station may determine at least one of a range of delay values for each CSI-RS port group or the number of CSI-RS ports included in the CSI-RS port group.

In addition, configuration information related to CSI may include a port index of a CSI-RS port to be reported for each at least one CSI-RS port group, delay value, and information related to combinations of one or more of the coefficients (e.g., number of combinations, etc.). For example, the fact that the number of combinations of the port index, delay value, and coefficient of the CSI-RS port is 1 may mean that a combination of a port index, a delay value, and a coefficient of one CSI-RS port can be reported for each CSI-RS port group. That is, the number of combinations of one or more of the port index, delay value, and coefficient of the CSI-RS port included in the configuration information related to CSI may be defined to mean a minimum or maximum value of a combination of at least one of a port index of a CSI-RS port to be reported or reportable by the UE, a delay value, and a coefficient.

Additionally or alternatively, as described in embodiment 1 above, at least one CSI-RS port group may correspond to at least one NZP CSI-RS resource, respectively. In addition, configuration information related to CSI may include information for configuring K (K is a natural number) NZP CSI-RS resources including at least one CSI-RS port and NZP CSI-RS resource sets including NZP CSI-RS resources. In addition, configuration information related to CSI may include information for setting each of the K NZP CSI-RS resources to have different time domain characteristics. The time domain feature may include, for example, at least one of periodic, semi-persistent, or aperiodic features.

The base station may transmit the CSI-RS to the UE through a plurality of CSI-RS ports (S1602). Here, a plurality of CSI-RS ports may be grouped into at least one CSI-RS port group as described above.

The base station may pre-compensate for a specific delay value for a CSI-RS port included in at least one CSI-RS port group before transmitting the CSI-RS. The pre-compensated delay value may be determined based on a delay range for each CSI-RS group including at least one CSI-RS port or predefined according to a rule between the base station and the UE.

The base station may transmit the CSI-RS based on the number of CSI-RS ports included in each CSI-RS port group and the uplink channel estimation value to the UE through the CSI-RS port for which the delay value is pre-compensated. For example, when the number of CSI-RS ports per CSI-RS port group is 3, it may be interpreted that the CSI-RS port (i.e., angle) may vary within ±1. The base station may transmit to the UE a CSI-RS to which a precoding matrix corresponding to a port corresponding to a difference of +1/0/−1 to a port value of an uplink channel estimated based on an uplink sounding signal is applied.

The base station may receive CSI from the terminal for each at least one CSI-RS port group based on the configuration information (S1603).

Here, the CSI may include one or more of a port index, a delay value, or a coefficient for each of one or more specific CSI-RS ports per at least one CSI-RS port group.

For example, the base station may receive CSI including one or more optimal coefficients corresponding to a specific CSI-RS port/delay value from the terminal, based on the downlink channel value corresponding to the specific one or more CSI-RS ports (i.e., angle) and the delay value of the specific one or more CSI-RS ports for each CSI-RS port group. At this time, the base station may not clearly know which CSI-RS port/delay value the coefficient reported by the terminal corresponds to. Accordingly, the base station may receive CSI including one or more coefficients and the port index and delay value of the CSI-RS port corresponding to the one or more coefficients from the UE.

The base station may perform downlink transmission, through the precoding matrix and coefficients determined based on the port index of each of one or more CSI-RS ports for each CSI-RS port group and the delay value and coefficient of each of the one or more CSI-RS ports, to the UE. That is, the base station may transmit data to the UE through the precoding matrix and coefficients determined based on the reported CSI.

Additionally or alternatively, the CSI may include one or more CSI-RS resource indicators (CRI). For example, the UE may transmit CSI including a combination of a specific CRI combination/value and a port index of a CSI-RS port corresponding to the specific CRI combination/value, a delay value, and a combination of coefficients to the base station.

Additionally or alternatively, if at least one CSI-RS port group corresponds to each of at least one NZP CSI-RS resource, the base station may receive CSI including L (K≥L, L is a natural number) NZP CSI-RS resources among K NZP CSI-RS resources, a port index of each of one or more specific CSI-RS ports for each L NZP CSI-RS resource, at least one of delay values or coefficients associated with each specific CSI-RS port for each of the L NZP CSI-RS resources, and CRI corresponding to each of the L NZP CSI-RS resources from the UE.

Here, a new criterion or threshold may be introduced to select a specific CRI combination/value when CSI is received from the UE. For example, if there is a CSI-RS port having an amplitude equal to or greater than a specific threshold in the first NZP CSI-RS resource among K NZP CSI-RS resources, the base station may receive CSI including the CRI corresponding to the first NZP CSI-RS from the UE.

General Device to which the Present Disclosure May be Applied

Figure 17:
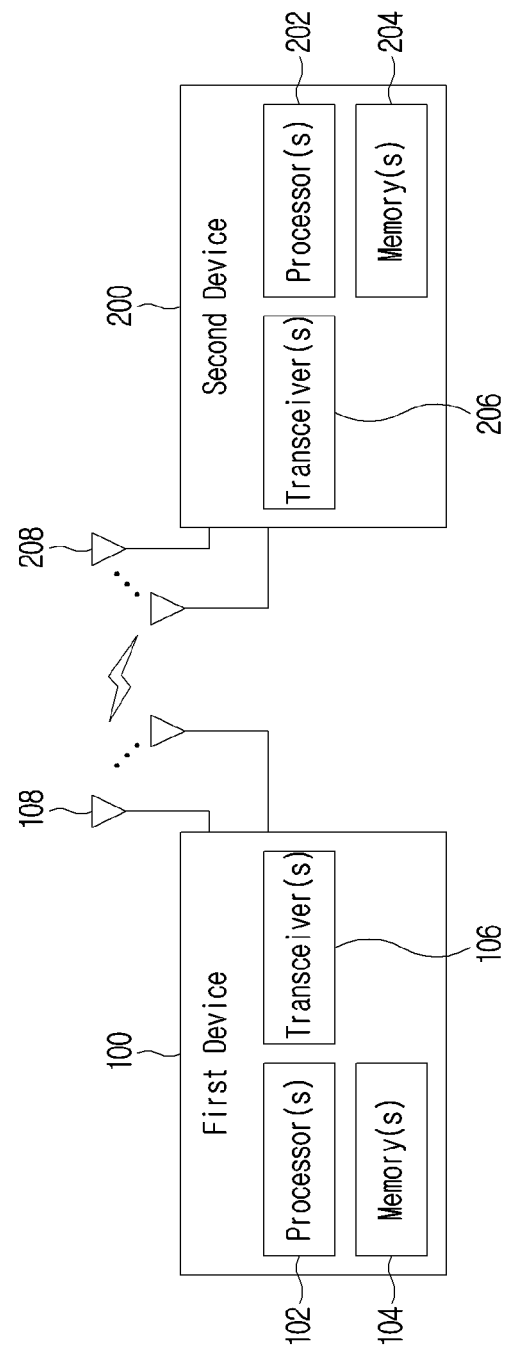
FIG. 17 illustrates a block configuration diagram of a wireless communication device according to an embodiment of the present disclosure.

FIG. 17 is a diagram which illustrates a block diagram of a wireless communication system according to an embodiment of the present disclosure.

In reference to FIG. 17, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a user equipment (UE) from a base station, configuration information related to channel state information (CSI);
receiving, by the UE from the base station, a channel state information reference signal (CSI-RS) through a plurality of CSI-RS ports; and
transmitting, by the UE to the base station, the CSI for each of at least one CSI-RS port group based on the configuration information,
wherein the plurality of CSI-RS ports are grouped into the at least one CSI-RS port group,
wherein each of the at least one CSI-RS port group includes at least one CSI-RS port, and
wherein the CSI includes a port index, a delay value, and a coefficient for each of at least one CSI-RS port for each of the at least one CSI-RS port group.

2. The method of claim 1, wherein:
the configuration information includes information on a number of combinations of at least one of the CSI-RS port index, the delay value, or the coefficient to be reported for each of the at least one CSI-RS port group.

3. The method of claim 1, wherein:
the configuration information includes information on at least one of a range of delay values for each of the at least one CSI-RS port group or a number of CSI-RS ports included in the at least one CSI-RS port group.

4. The method of claim 1, wherein:
information on a capability of the UE related to at least one of a range of delay values or a number of CSI-RS ports is transmitted to the base station.

5. The method of claim 1, wherein:
the CSI-RS is transmitted from the base station based on a number of CSI-RS ports included in the at least one CSI-RS port group and an uplink channel estimation value, through at least one CSI-RS port for which a delay value is pre-compensated.

6. The method of claim 5, wherein:
the pre-compensated delay value is determined or pre-defined based on a delay range for each CSI-RS port group including the at least one CSI-RS port.

7. The method of claim 1, wherein:
each of the at least one CSI-RS port group corresponds to at least one non-zero power (NZP) CSI-RS resource, and
the configuration information includes information for configuring K (K is a natural number) NZP CSI-RS resources including at least one CSI-RS port and an NZP CSI-RS resource set including the K NZP CSI-RS resources.

8. The method of claim 7, wherein:
the CSI includes at least one of L (K≥L, L is a natural number) NZP CSI-RS resources among the K NZP CSI-RS resources, a port index of at least one of specific CSI-RS port for each of the L NZP CSI-RS resources, and a coefficient or delay value related to at least one of specific CSI-RS port for each of the L NZP CSI-RS resources.

9. The method of claim 7, wherein:
the configuration information includes information for configuring each of the K NZP CSI-RS resources to have different time domain characteristics, and
the time domain characteristics is one of periodic, semi-persistent, or aperiodic.

10. The method of claim 7, wherein:
the CSI includes at least one CSI-RS resource indicator (CRI), and
the CSI includes a port index of each of at least one specific CSI-RS port for each of the L NZP CSI-RS resources, at least one of delay values or coefficients associated with each of the at least one specific CSI-RS port for each of the L NZP CSI-RS resources, and CRI corresponding to each of the L NZP CSI-RS resources.

11. The method of claim 7, wherein:
when a CSI-RS port having an amplitude equal to or greater than a specific threshold exists in a first NZP CSI-RS resource among the K NZP CSI-RS resources, the CSI further includes a CRI corresponding to the first NZP CSI-RS.

12. The method of claim 1, wherein:
downlink transmission from the base station is performed based on a precoding matrix and a coefficient determined based on a port index of each of the at least one CSI-RS port for each of the at least one CSI-RS port group and the delay value and coefficient of each of the at least one CSI-RS port.

13. The method of claim 1, wherein:
the coefficient includes at least one of an amplitude value or a phase value.

14. A user equipment (UE) comprising:
at least one transceiver for transmitting and receiving radio signals; and
at least one processor controlling the at least one transceiver,
wherein the at least one processor is configured to:
receive, from a base station through the at least one transceiver, configuration information related to channel state information (CSI);
receive, from the base station through the at least one transceiver, a channel state information reference signal (CSI-RS) through a plurality of CSI-RS ports; and
transmit, to the base station through the at least one transceiver, the CSI for each of at least one CSI-RS port group based on the configuration information,
wherein the plurality of CSI-RS ports are grouped into the at least one CSI-RS port group,
wherein each of the at least one CSI-RS port group includes at least one CSI-RS port, and
wherein the CSI includes a port index, a delay value, and a coefficient for each of at least one CSI-RS port for each of the at least one CSI-RS port group.

15. A base station comprising:
at least one transceiver for transmitting and receiving radio signals; and
at least one processor controlling the at least one transceiver,
wherein the at least one processor is configured to:
transmit, to a user equipment (UE) through the at least one transceiver, configuration information related to channel state information (CSI);
transmit, to the UE through the at least one transceiver, a channel state information reference signal (CSI-RS) through a plurality of CSI-RS ports; and
receive, from the UE through the at least one transceiver, the CSI for each of at least one CSI-RS port group based on the configuration information,
wherein the plurality of CSI-RS ports are grouped into the at least one CSI-RS port group,
wherein each of the at least one CSI-RS port group includes at least one CSI-RS port, and
wherein the CSI includes a port index, a delay value, and a coefficient for each of at least one specific CSI-RS port for each of the at least one CSI-RS port group.

* * * * *